US010203757B2

(12) United States Patent
Levesque et al.

(10) Patent No.: US 10,203,757 B2
(45) Date of Patent: Feb. 12, 2019

(54) SYSTEMS AND METHODS FOR SHAPE INPUT AND OUTPUT FOR A HAPTICALLY-ENABLED DEFORMABLE SURFACE

(71) Applicant: Immersion Corporation, San Jose, CA (US)

(72) Inventors: Vincent Levesque, Montreal (CA); Danny Grant, Laval (CA); Jamal Saboune, Montreal (CA); Abdelwahab Hamam, Montreal (CA); William Rihn, San Jose, CA (US)

(73) Assignee: Immersion Corporation, San Jose, CA (US)

( * ) Notice: Subject to any disclaimer, the term of this patent is extended or adjusted under 35 U.S.C. 154(b) by 0 days.

(21) Appl. No.: 15/496,678

(22) Filed: Apr. 25, 2017

(65) Prior Publication Data

US 2017/0228122 A1    Aug. 10, 2017

Related U.S. Application Data

(63) Continuation of application No. 14/465,005, filed on Aug. 21, 2014, now Pat. No. 9,690,381.

(51) Int. Cl.
*G06F 1/16*     (2006.01)
*G06F 3/01*     (2006.01)
(Continued)

(52) U.S. Cl.
CPC .............. *G06F 3/016* (2013.01); *G06F 3/011* (2013.01); *G06F 3/017* (2013.01); *G06F 3/038* (2013.01);
(Continued)

(58) Field of Classification Search
CPC ........ G06F 3/016; G06F 3/041; G06F 3/0487; G06F 3/011; H04M 1/7253; H04M 1/0268
See application file for complete search history.

(56) References Cited

U.S. PATENT DOCUMENTS 4,330,730 A     5/1982   Kurz et al.
6,160,540 A    12/2000   Fishkin et al.
(Continued)

FOREIGN PATENT DOCUMENTS

CN      101436099 A     5/2009
CN      102067068 A     5/2011
(Continued)

OTHER PUBLICATIONS

State Intellectual Property Office of the Peoples Republic of China Application No. 201410180557.8, Office Action dated Jun. 2, 2017.
(Continued)

*Primary Examiner* — Ibrahim A Khan
(74) *Attorney, Agent, or Firm* — Kilpatrick Townsend & Stockton LLP

(57) ABSTRACT

One illustrative computing device disclosed herein includes a first sensor configured to detect a position associated with a deformable surface and transmit a sensor signal associated with the position; and a processor in communication with the sensor, the processor configured to: receive the sensor signal; determine a haptic effect based at least in part on the sensor signal; and transmit a haptic signal associated with the haptic effect. The illustrative computing device also includes a haptic output device in communication with the processor, the haptic output device configured to receive the haptic signal and output the haptic effect.

17 Claims, 12 Drawing Sheets

(51) Int. Cl.
*G06F 3/0487* (2013.01)
*H04M 1/725* (2006.01)
*G06F 3/041* (2006.01)
*G06F 3/044* (2006.01)
*G06F 3/0484* (2013.01)
*G06F 3/038* (2013.01)
*H04N 21/422* (2011.01)
*H04M 1/02* (2006.01)

(52) U.S. Cl.
CPC .............. *G06F 3/041* (2013.01); *G06F 3/044* (2013.01); *G06F 3/0484* (2013.01); *G06F 3/0487* (2013.01); *H04M 1/7253* (2013.01); *H04N 21/42222* (2013.01); *G06F 2203/0383* (2013.01); *G06F 2203/04102* (2013.01); *G06F 2203/04106* (2013.01); *H04M 1/0268* (2013.01)

(56) References Cited

U.S. PATENT DOCUMENTS

| | | | |
|---|---|---|---|
| 6,337,678 | B1 | 1/2002 | Fish |
| 6,429,846 | B2 | 8/2002 | Rosenberg et al. |
| 6,703,924 | B2 | 3/2004 | Tecu et al. |
| 6,803,924 | B1 | 10/2004 | Snibbe et al. |
| 6,819,304 | B2 | 11/2004 | Branson |
| 6,819,312 | B2 | 11/2004 | Fish |
| 7,196,688 | B2 | 3/2007 | Schena |
| 8,427,433 | B2 | 4/2013 | Edwards et al. |
| 9,323,326 | B2 | 4/2016 | Cruz-Hernandez et al. |
| 9,405,368 | B2 | 8/2016 | Modarres et al. |
| 9,639,158 | B2 | 5/2017 | Levesque et al. |
| 9,823,833 | B2 | 11/2017 | Grant et al. |
| 2002/0021277 | A1 | 2/2002 | Kramer et al. |
| 2002/0044132 | A1 | 4/2002 | Fish |
| 2002/0108439 | A1 | 8/2002 | Whitehead |
| 2003/0174121 | A1 | 9/2003 | Poupyrev et al. |
| 2003/0179190 | A1 | 9/2003 | Franzen |
| 2004/0008191 | A1 | 1/2004 | Poupyrev et al. |
| 2004/0041800 | A1 | 3/2004 | Daniels |
| 2004/0217877 | A1 | 11/2004 | Kokonaski et al. |
| 2004/0233161 | A1 | 11/2004 | Shahoian et al. |
| 2004/0268391 | A1 | 12/2004 | Clercq et al. |
| 2005/0030292 | A1 | 2/2005 | Diederiks |
| 2005/0040962 | A1 | 2/2005 | Funkhouser et al. |
| 2005/0057528 | A1 | 3/2005 | Kleen |
| 2006/0099808 | A1 | 5/2006 | Kondo |
| 2006/0194619 | A1 | 8/2006 | Wilcox et al. |
| 2006/0211217 | A1 | 9/2006 | Xu et al. |
| 2007/0211036 | A1 | 9/2007 | Perkins |
| 2007/0236450 | A1 | 10/2007 | Colgate et al. |
| 2008/0261057 | A1 | 10/2008 | Slobodin |
| 2008/0266273 | A1 | 10/2008 | Slobodin et al. |
| 2008/0297878 | A1 | 12/2008 | Brown et al. |
| 2008/0303782 | A1 | 12/2008 | Grant et al. |
| 2009/0096632 | A1 | 4/2009 | Ullrich et al. |
| 2010/0013761 | A1 | 1/2010 | Birnbaum et al. |
| 2010/0056223 | A1 | 3/2010 | Choi et al. |
| 2010/0090813 | A1 | 4/2010 | Je et al. |
| 2010/0225600 | A1 | 9/2010 | Dai et al. |
| 2010/0231367 | A1 | 9/2010 | Cruz-Hernandez et al. |
| 2010/0231508 | A1 | 9/2010 | Cruz-Hernandez et al. |
| 2010/0231539 | A1 | 9/2010 | Cruz-Hernandez et al. |
| 2010/0231540 | A1 | 9/2010 | Cruz-Hernandez et al. |
| 2010/0231541 | A1 | 9/2010 | Cruz-Hernandez et al. |
| 2010/0231550 | A1 | 9/2010 | Cruz-Hernandez et al. |
| 2010/0238114 | A1 | 9/2010 | Vartanian et al. |
| 2010/0283731 | A1 | 11/2010 | Grant et al. |
| 2010/0302199 | A1 | 12/2010 | Taylor et al. |
| 2011/0021272 | A1 | 1/2011 | Grant et al. |
| 2011/0191674 | A1 | 8/2011 | Rawley et al. |
| 2011/0227872 | A1 | 9/2011 | Huska et al. |
| 2011/0267294 | A1 | 11/2011 | Kildal |
| 2012/0032877 | A1* | 2/2012 | Watkins, Jr. .......... G06F 1/1624 345/156 |
| 2012/0133494 | A1 | 5/2012 | Cruz-Hernandez et al. |
| 2012/0139844 | A1 | 6/2012 | Ramstein et al. |
| 2012/0169609 | A1 | 7/2012 | Britton |
| 2012/0229400 | A1 | 9/2012 | Birnbaum et al. |
| 2012/0268412 | A1 | 10/2012 | Cruz-Hernandez et al. |
| 2013/0009882 | A1 | 1/2013 | Salmela |
| 2013/0009892 | A1 | 1/2013 | Salmela |
| 2013/0201093 | A1* | 8/2013 | Kim ................. G06F 3/033 345/156 |
| 2013/0201115 | A1 | 8/2013 | Heubel |
| 2013/0241860 | A1 | 9/2013 | Ciesla et al. |
| 2013/0265262 | A1 | 10/2013 | Jung et al. |
| 2013/0293453 | A1 | 11/2013 | Hwang |
| 2014/0049137 | A1 | 2/2014 | Ando et al. |
| 2014/0049463 | A1 | 2/2014 | Seo et al. |
| 2014/0055345 | A1 | 2/2014 | Seo et al. |
| 2014/0055358 | A1 | 2/2014 | Birnbaum et al. |
| 2014/0098028 | A1 | 4/2014 | Kwak et al. |
| 2014/0253302 | A1 | 9/2014 | Levesque et al. |
| 2014/0267013 | A1 | 9/2014 | Grant et al. |
| 2014/0267065 | A1 | 9/2014 | Levesque |
| 2014/0306891 | A1 | 10/2014 | Latta et al. |
| 2014/0313142 | A1 | 10/2014 | Yairi |
| 2014/0320393 | A1 | 10/2014 | Modarres |
| 2014/0320396 | A1 | 10/2014 | Modarres et al. |
| 2014/0320431 | A1 | 10/2014 | Cruz Hernandez et al. |
| 2014/0320435 | A1 | 10/2014 | Modarres et al. |
| 2014/0362014 | A1 | 12/2014 | Ullrich |
| 2015/0009168 | A1 | 1/2015 | Levesque et al. |
| 2015/0022472 | A1 | 1/2015 | Jung et al. |
| 2015/0054727 | A1 | 2/2015 | Saboune et al. |
| 2015/0145656 | A1 | 5/2015 | Levesque et al. |
| 2015/0189223 | A1 | 7/2015 | Levesque et al. |
| 2015/0286288 | A1 | 10/2015 | Lee et al. |
| 2015/0293592 | A1* | 10/2015 | Cheong ................ G06F 3/016 345/173 |
| 2015/0323993 | A1 | 11/2015 | Levesque et al. |
| 2016/0011660 | A1 | 1/2016 | Wieder |
| 2016/0054799 | A1 | 2/2016 | Levesque et al. |
| 2016/0147333 | A1 | 5/2016 | Levesque |

FOREIGN PATENT DOCUMENTS

| | | |
|---|---|---|
| CN | 102209946 A | 10/2011 |
| EP | 2 626 775 | 8/2013 |
| EP | 2 703 952 | 3/2014 |
| EP | 2 750 015 | 7/2014 |
| JP | 2000-148393 | 5/2000 |
| JP | 2003-060251 | 2/2003 |
| JP | 2003-280546 | 10/2003 |
| JP | 2003-288158 | 10/2003 |
| JP | 2004-071765 | 3/2004 |
| JP | 2005-114796 | 4/2005 |
| JP | 2006-154380 | 6/2006 |
| JP | 2007-121765 | 5/2007 |
| JP | 2010-529555 A | 8/2010 |
| JP | 2012-520520 A | 9/2012 |
| JP | 2012-520523 A | 9/2012 |
| JP | 2013-509652 A | 3/2013 |
| WO | 2010/105004 A1 | 9/2010 |
| WO | 2010/105011 A1 | 9/2010 |
| WO | 2011/059703 A1 | 5/2011 |
| WO | WO 2013/004919 | 1/2013 |

OTHER PUBLICATIONS

Japanese Patent Office Application No. 2014-089731, Office Action dated Dec. 20, 2017, 4 pages.
Ino, et al. Feeling of Grip for Sense Feedback Type Hand Psychophysical Study on Sensation, Journal of the Institute of Electronics Information and Communication, Japan, The Institute of Electronics, Information and Communication Engineers, vol. J75-D-II, No. 11, pp. 1909-1916.
Bau, O. et al., TeslaTouch: Electrovibration for Touch Surfaces, UIST '10 Proceedings of the 23nd annual ACM symposium on User interface software and technology, pp. 283-292, 2010.
European Patent Office, European Search Report, Application No. 15180441 dated Dec. 11, 2015.

(56) References Cited

OTHER PUBLICATIONS

Levesque, V. et al., Exploring the Design Space of Programmable Friction for Scrolling Interactions, 2012 IEEE Haptics Symposium (HAPTICS), pp. 23-30, Mar. 2012.
Mistry, P. et al., SixthSense: A Wearable Gestural Interface, Proceeding—SIGGRAPH Asia '09 ACM SIGGRAPH Asia 2009 Sketches, Article No. 11, 2009.
Visual Planet: Touch Foil, 5 pages, Sep. 9, 2007.
Morphees: Shape-shifting mobile devices, BIG Bristol Interaction and Graphics, web page at http://big.cs.bris.ac.uk/projects/morphees, as available via the Internet and printed Dec. 5, 2014.
Ahmaniemi et al., What is a device bend gesture really good for? CHI 2014, One of a CHInd, Toronto, ON, Canada, Apr. 26-May 1, 2014, pp. 3503-3512.
E-Ink Electronic Paper Display, 3 pages, Sep. 9, 2007.
Fujitsu's Film Substrate-Based Bendable Color Electronic Paper featuring Image Memory Function, 3 pages, Feb. 21, 2007.
Haptic Confirmation of User Input for Head-Mounted Displays, Disclosed anonymously.
Haptic Feedback for Privacy Awareness, Disclosed anonymously.
Haptic Feedback on Head-Mounted Displays, Disclosed anonymously.
Iwamoto, T. et al., High Resolution Tactile Display Using Acoustic Radiation Pressure, SCE Annual Conference in Sapporo, pp. 1239-1244, 2004.
Kane, S. et al., Bonfire: A Nomadic System for Hybrid Laptop-Tabletop Interaction, Proceeding—UIST '09 Proceedings of the 22nd annual ACM symposium on User interface software and technology, pp. 129-138, 2009.
Linder, N. et al., LuminAR: Portable Robotic Augmented Reality Interface Design and Prototype, Proceeding—UIST '10 Adjunct proceedings of the 23nd annual ACM symposium on User interface software and technology, pp. 395-396, 2010.
NEC's Flexible Battery, 3 pages, Sep. 9, 2007.
Philips Screen, 3 pages, Feb. 21, 2007.
Siemens Wafer-Thin Color Displays for Packaging, 2 pages, Feb. 21, 2007.
Sodhi, R. et al., AIREAL: Interactive Tactile Experiences in Free Air, SIGGRAPH '13, Jul. 21-25, 2013, Anaheim, CA, USA.
United States Patent and Trademark Office, Office Action, U.S. Appl. No. 14/552,987 dated Apr. 6, 2016.
Willis, K. et al., SideBySide: Ad-hoc Multi-user Interaction with Handheld Projectors, UIST '11 Proceedings of the 24th annual ACM symposium on User interface software and technology, pp. 431-440, 2011.
Xerox Electronic Reusable Paper, 2 pages, Feb. 21, 2007.
Roudaut, A. et al., Morphees: Toward High "Shape Resolution" in Self-Actuated Flexible Mobile Device, CHI'13, Apr. 27-May 2, 2013, Paris France.
U.S. Appl. No. 14/222,518, Non-Final Office Action dated Jun. 1, 2017.
U.S. Appl. No. 15/355,817, Non-Final Office Action dated Oct. 5, 2017, 14 pages.
EP 14164621.6, "Extended European Search Report", dated Sep. 18, 2014, 7 pages.
EP 14164621.6, "Communication Pursuant to Article 94(3) EPC", Apr. 6, 2018, 5 pages.

* cited by examiner

SYSTEMS AND METHODS FOR SHAPE INPUT AND OUTPUT FOR A HAPTICALLY-ENABLED DEFORMABLE SURFACE

CROSS REFERENCE TO RELATED APPLICATIONS

This application is a continuation of and claims priority to U.S. patent application Ser. No. 14/465,005, filed Aug. 21, 2014 and entitled "Systems and Methods for Shape Input and Output for a Haptically-Enabled Deformable Surface," the entirety of which is incorporated herein by reference.

FIELD OF THE INVENTION

The present invention relates to the field of user interface devices. More specifically, the present invention relates to shape input and output for a haptically-enabled deformable surface.

BACKGROUND

As computer-based systems become more prevalent, the quality of the interfaces through which humans interact with these systems is becoming increasingly important. One interface that is of growing popularity due to its intuitive and interactive nature is the touchscreen display. Through a touchscreen display, a user can perform a variety of tasks by contacting a region of the touchscreen with the user's finger. To create a more intuitive and enhanced user experience, designers often leverage user experience with physical interactions. This is generally done by reproducing some aspects of interactions with the physical world through visual, audio, and/or haptic feedback (e.g., a mechanical vibration).

Recently, computing devices have been developed that are deformable. These deformable devices can be bent, squeezed, flexed, twisted, folded, and/or rolled. There is a need for additional interfaces for these deformable computing devices.

SUMMARY

Embodiments of the present disclosure comprise shape input and output for a haptically-enabled deformable surface. In one embodiment, a computing device of the present disclosure may comprise: a sensor configured to detect a position associated with a deformable surface and transmit a sensor signal comprising data associated with the position; and a processor in communication with the sensor, the processor configured to: receive the sensor signal; determine a haptic effect based at least in part on the sensor signal; and transmit the haptic signal. The computing device may also comprise a haptic output device in communication with the processor, the haptic output device configured to receive the haptic signal and output the haptic effect.

In another embodiment, a method of the present disclosure may comprise: receiving a sensor signal associated with a position associated with a deformable surface; determining a haptic effect based at least in part on the sensor signal; and transmitting the haptic signal to a haptic output device. Yet another embodiment comprises a computer-readable medium for implementing such a method.

These illustrative embodiments are mentioned not to limit or define the limits of the present subject matter, but to provide examples to aid understanding thereof. Further embodiments are discussed in the Detailed Description, and additional description is provided there. Advantages offered by various embodiments may be further understood by examining this specification and/or by practicing one or more embodiments of the claimed subject matter.

BRIEF DESCRIPTION OF THE DRAWINGS

A full and enabling disclosure is set forth more particularly in the remainder of the specification. The specification makes reference to the following appended figures.

DETAILED DESCRIPTION

Figure 1:
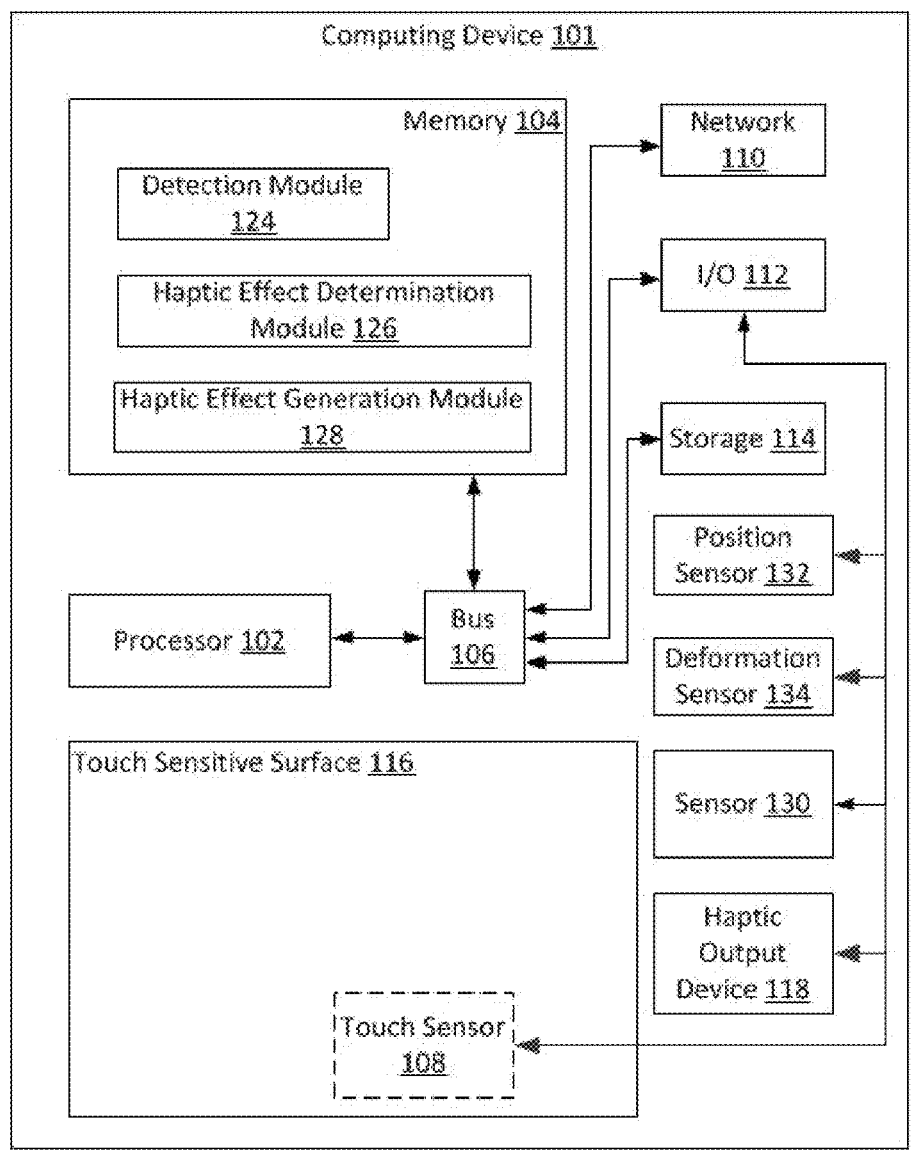
FIG. 1 is a block diagram showing a system for shape input and output for a haptically-enabled deformable surface according to one embodiment.

Reference will now be made in detail to various and alternative illustrative embodiments and to the accompanying drawings. Each example is provided by way of explanation, and not as a limitation. It will be apparent to those skilled in the art that modifications and variations can be made. For instance, features illustrated or described as part of one embodiment may be used in another embodiment to yield a still further embodiment. Thus, it is intended that this disclosure include modifications and variations as come within the scope of the appended claims and their equivalents.

Illustrative Examples of Shape Input and Output for a Haptically-Enabled Deformable Surface One illustrative embodiment of the present disclosure comprises a computing device configured with a deformable touch-screen display. The computing device may be, for example, a smartphone, tablet, laptop computer, pocket organizer, or portable music player. Further, the computing device and/or the touch-screen display may be flexible, foldable, bendable, twistable, stretchable, squeezable, rollable, and/or otherwise deformable.

In the illustrative embodiment, the computing device includes a deformation sensor (e.g., a strain gauge) for detecting user interactions with the computing device and providing sensor signals associated with the interactions to a processor in the computing device. A user interaction may comprise, for example, bending, twisting, squeezing, rolling, or folding the computing device. Further, in the illustrative embodiment, the computing device includes a position sensor (e.g., a global positioning system unit or gyroscope) for determining the position of the computing device in real space, or with respect to an object, and providing one or more sensor signals associated with the position to the processor. An object, as used herein, is anything with which the computing device may potentially interact. For example, in some embodiments, an object may comprise a remote device (e.g., another computing device, a tablet, laptop computer, desktop computer, e-reader, mobile phone, wearable device, smart device, person, or body part), a virtual object (e.g., output by an augmented reality application), or a data source (e.g., a person, animal, or automobile).

In the illustrative embodiment, the computing device determines, based at least in part on the user interaction, a function to perform. A function, as used herein, comprises a task associated with an application executing on the computing device and/or a remote device. For instance, in some embodiments, a function may comprise manipulating a virtual object (e.g., a virtual button, slider, image, or widget) based on user input, selecting a program option or setting, recording a sound, outputting a sound, performing a calculation, sending data, or receiving data associated with an application. Further, in the illustrative embodiment, the computing device determines, based at least in part on the position, an object to associate with the function. The computing device may then execute the function.

For example, in the illustrative embodiment, the computing device comprises a microphone and a music recording application. The user may wish to record a sound, for example, a song playing in a coffee shop. In the illustrative embodiment, to begin recording the sound, the user may point the computing device in the direction of a speaker in the coffee shop and bend the computing device into a cone shape. The computing device may detect the cone shape and begin recording. Further, the computing device may detect the directionality and/or orientation of the computing device and determine, for example, that the sound coming from the speaker is the sound the user wishes to record. Thus, the computing device may filter sounds from other sources, such as speech from other coffee house patrons, sounds from cars in the parking lot, or sounds from other computing devices in the vicinity (e.g., music from another patron's laptop computer or MP3 player). When the user wishes to finish recording, the user may unbend the computing device. The computing device may detect the change in the shape of the computing device and stop recording the music. Thus, the user may be able to intuitively interact with the computing device, such as to record music, by manipulating the shape and/or direction of the computing device.

In the illustrative embodiment, the computing device further comprises a haptic output device. The computing device may provide haptic feedback to a user in response to an event. An event, as used herein, is any interaction, action, collision, or other event which occurs during operation of the computing device which can potentially comprise an associated haptic effect. In some embodiments, an event may comprise user input (e.g., a button press; manipulating a joystick; interacting with a touch-sensitive surface; tilting or orienting the computing device; or flexing, bending, or otherwise deforming the computing device), a system status (e.g., low battery, low memory, or a system notification, such as a notification generated based on the system receiving an incoming call), sending data, receiving data, or a program event. For example, in the illustrative embodiment, the computing device outputs a haptic effect comprising a rumble vibration (e.g., a low magnitude, long-duration vibration) when the computing device begins recording. This may indicate to the user that recording has begun and/or is ongoing. Further, the computing device outputs a pulsed vibration when the computing device ends recording. Thus, in the illustrative embodiment, haptic feedback may provide confirmation to the user that an operation has been initiated, is ongoing, or has been completed.

Another illustrative embodiment comprises a computing device configured to determine a function based at least in part on a system mode. A system mode, as used herein, is an operational state of the computing device. For example, in some embodiments, a system mode may comprise receiving data (e.g., user input or data from a remote device), transmitting data, recording sound, outputting sound, executing a function, displaying data (e.g., on the touch-screen display), or awaiting user input. Further, in the illustrative embodiment, the computing device determines, based at least in part on the position, an object to associate with the function. The computing device may then execute the function.

For example, in the illustrative embodiment, the computing device comprises a mobile device (e.g., a smart phone). The user may wish to use the computing device to conduct a conference call (i.e., a phone call with multiple attendees). The user may press a speaker-phone button on the computing device to initiate a speaker phone mode (e.g., the computing device may increase the sound output volume and the input sensitivity of a microphone associated with the computing device) on the computing device. Further, the user may place the computing device on a conference room table in an office so that other people near the table can engage in the conference call. In the illustrative embodiment, the computing device may determine its position and orientation in real space (e.g., in the conference room and/or on the conference room table). Based on the speaker phone mode and the position of the computing device in real space, the computing device may execute a function, for example, calling a plurality of pre-designated conference call participants in other offices.

Further, in the illustrative embodiment, the computing device outputs a haptic effect associated with the system mode. For example, the computing device may output a haptic effect configured to deform the physical shape of the computing device, e.g., by bending the shape of the computing device into an arch. The arch may indicate to the user that the computing device is in a speaker phone mode. In the illustrative embodiment, once the conference call is complete (e.g., the computing device determines that the phone call has ended), the computing device may output a haptic effect configured to change its shape back to its original, unbent shape. This may indicate to the user that the computing device is no longer in the speaker phone mode and/or that the conference call has ended.

The description of the illustrative embodiment above is provided merely as an example. Various other embodiments of the present invention are described herein and variations of such embodiments would be understood by one of skill in the art. Advantages offered by various embodiments may be further understood by examining this specification and/or by practicing one or more embodiments of the claimed subject matter.

Illustrative Systems for Shape Input for a Haptically-Enabled Deformable Surface FIG. 1 is a block diagram showing a computing device 101 for a haptically-enabled deformable surface according to one embodiment. In this example, the computing device 101 is flexible, foldable, bendable, twistable, squeezable, stretchable, rollable, and/or otherwise deformable. In some embodiments, the computing device 101 may comprise two or more rigid components coupled by one or more hinges. The computing device 101 may deform by pivoting the two or more rigid components about the one or more hinges.

Figure 2:
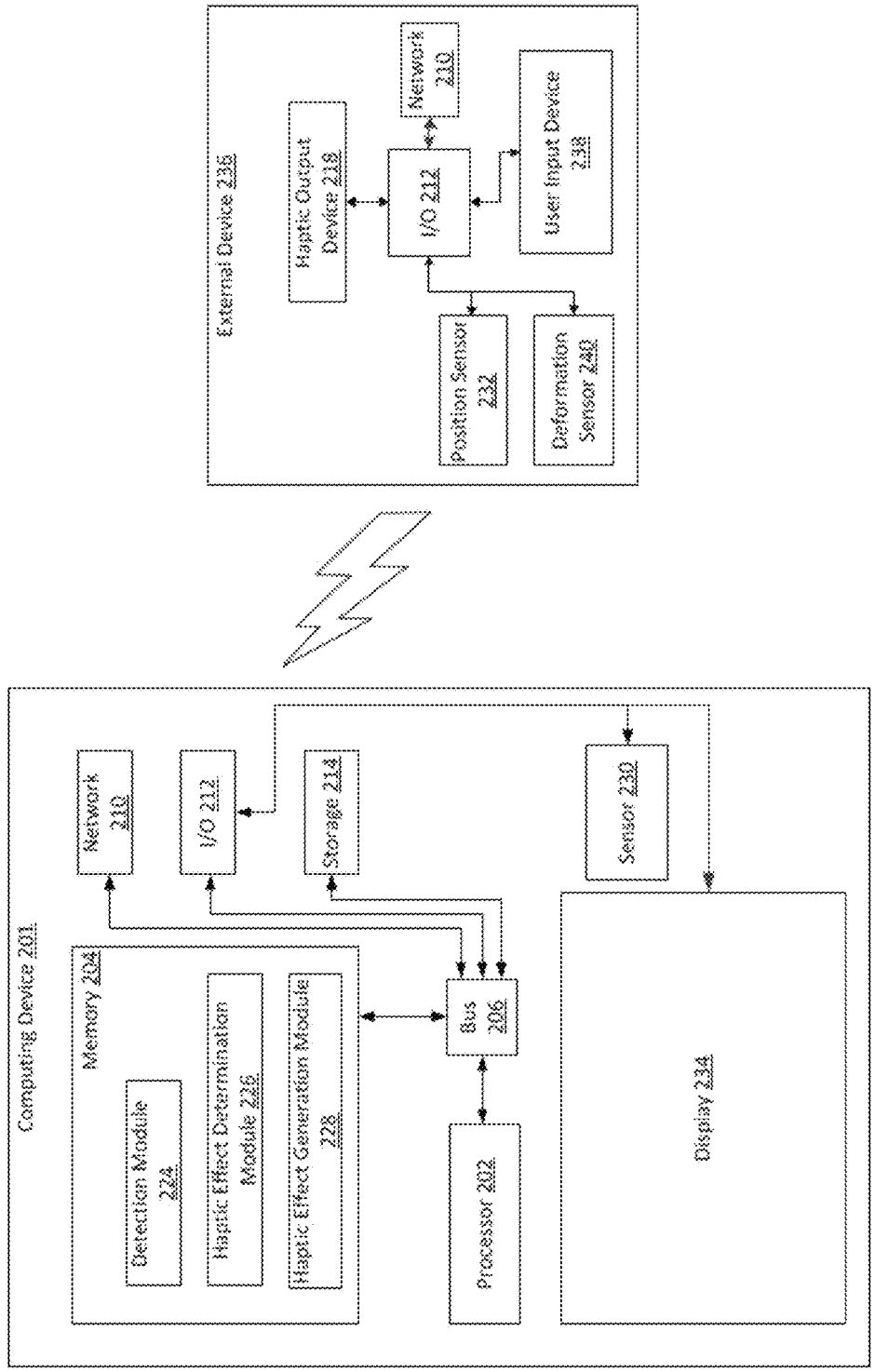
FIG. 2 is another block diagram showing a system for shape input and output for a haptically-enabled deformable surface according to another embodiment.

The computing device 101 may comprise, for example, a smartphone, tablet, e-reader, laptop computer, portable gaming device, or a wearable device. In some embodiments, the wearable device may comprise a shoe, an armband, a sleeve, a jacket, glasses, a glove, a ring, a watch, a wristband, a bracelet, an article of clothing, a hat, a headband, and/or jewelry. While computing device 101 is shown as a single device in FIG. 1, in other embodiments, the computing device 101 may comprise multiple devices, for example, as shown in FIG. 2.

In this example, the computing device 101 comprises a processor 102 interfaced with other hardware via bus 106. A memory 104, which can comprise any suitable tangible (and non-transitory) computer-readable medium such as RAM, ROM, EEPROM, or the like, may embody program components that configure operation of the computing device 101. In some embodiments, the computing device 101 may further comprise one or more network interface devices 110, input/output (I/O) interface components 112, and additional storage 114.

Network device 110 can represent one or more of any components that facilitate a network connection. Examples include, but are not limited to, wired interfaces such as Ethernet, USB, IEEE 1394, and/or wireless interfaces such as IEEE 802.11, Bluetooth, or radio interfaces for accessing cellular telephone networks (e.g., transceiver/antenna for accessing a CDMA, GSM, UMTS, or other mobile communications network).

I/O components 112 may be used to facilitate connection to devices such as one or more displays, keyboards, mice, speakers, microphones, buttons, and/or other hardware used to input data or output data. Storage 114 represents non-volatile storage such as read-only memory, flash memory, ferroelectric RAM (F-RAM), magnetic, optical, or other storage media included in the computing device 101 or coupled to processor 102.

In some embodiments, the computing device 101 further includes a touch sensitive surface 116, which, in this example, is integrated into computing device 101. In other embodiments, the computing device 101 may not comprise the touch sensitive surface 116. Touch sensitive surface 116 represents any surface that is configured to sense tactile input of a user. One or more touch sensors 108 are configured to detect a touch in a touch area when an object contacts a touch sensitive surface 116 and provide appropriate data for use by processor 102. Any suitable number, type, or arrangement of sensors can be used. For example, resistive and/or capacitive sensors may be embedded in touch sensitive surface 116 and used to determine the location of a touch and other information, such as pressure, speed, and/or direction. As another example, optical sensors with a view of the touch sensitive surface 116 may be used to determine the touch position.

In other embodiments, the touch sensor 108 may comprise a LED (Light Emitting Diode) detector. For example, in one embodiment, touch sensitive surface 116 may comprise a LED finger detector mounted on the side of a display. In some embodiments, the processor 102 is in communication with a single touch sensor 108, in other embodiments, the processor 102 is in communication with a plurality of touch sensors 108, for example, a first touch-screen and a second touch screen. The touch sensor 108 is configured to detect user interaction, and based on the user interaction, transmit signals to processor 102. In some embodiments, touch sensor 108 may be configured to detect multiple aspects of the user interaction. For example, touch sensor 108 may detect the speed and pressure of a user interaction, and incorporate this information into the interface signal.

In some embodiments, computing device 101 may include a touch enabled display that combines a touch sensitive surface 116 and a display of the device. The touch sensitive surface 116 may correspond to the display exterior or one or more layers of material above components of the display. Further, in some embodiments, the touch sensitive surface 116 may be rollable, bendable, foldable, stretchable, twistable, squeezable, or otherwise deformable. For example, the touch sensitive surface 116 may comprise a bendable electronic paper. In other embodiments, touch sensitive surface 116 may not comprise (or otherwise correspond to) a display, depending on the particular configuration of the computing device 101.

The computing device 101 also comprises a position sensor 132. The position sensor 132 is configured to detect a position of the computing device 101 in real space and/or with respect to an object (e.g., a real or virtual object). The position sensor 132 is further configured to transmit a sensor signal associated with the position to processor 102. In some embodiments, the position sensor 132 may comprise a gyroscope, camera, radio frequency identification system, indoor proximity system, accelerometer, GPS unit, magnetometer, ultrasonic transducer, wireless interface (e.g., an IEEE 802.11 or Bluetooth interface), infrared sensors, a depth sensor or range sensor. For example, the position sensor 132 may comprise a wireless interface and be configured detect the strength of a wireless signal emitted by an object. The position sensor 132 may transmit a sensor signal associated with the wireless signal strength to the processor 102. Based on the wireless signal strength, the processor 102 may determine, for example, whether the computing device 101 is within a predefined distance of the object. As another example, the position sensor 132 may comprise a camera configured to take one or more pictures of an object. The position sensor 132 may transmit a sensor signal associated with the one or more pictures to the processor 102. Based on the sensor signal, the processor may determine the position (e.g., the distance or orientation) of the object with respect to the computing device 101. In some embodiments, the processor 132 may further determine one or more characteristics (e.g., the type, height, width, size, color, or shape) of the object based on the sensor signal. The processor 132 may execute one or more functions based on the one or more characteristics.

Although the embodiment shown in FIG. 1 depicts the position sensor 132 internal to computing device 101, in some embodiments, the position sensor 132 may be external to computing device 101 (e.g., as shown in FIG. 2). For example, in some embodiments, the one or more position sensors 132 may be associated with a wearable device.

The computing device 101 also comprises a deformation sensor 134. The deformation sensor 134 is configured to detect deformations (e.g., bending, flexing, stretching, folding, twisting, squeezing, or rolling) of a surface (e.g., computing device 101). For example, the deformation sensor 134 may comprise a pressure sensor, strain gauge, or a force sensor. The deformation sensor 134 is configured to transmit a sensor signal to the processor 102. Although the embodiment shown in FIG. 1 depicts the deformation sensor 134 internal to computing device 101, in some embodiments, the deformation sensor 134 may be external to computing device 101 (e.g., as shown in FIG. 2). For example, in some embodiments, the one or more deformation sensors 134 may be associated with a wearable device. As another example, in some embodiments, the one or more deformation sensors 134 may comprise a range or depth sensor, a 3D imaging system (e.g., the 3D imagining system commonly sold under the trademark Microsoft Kinect®), or a LED-based tracking system external to the computing device 101. The range or depth sensor, 3D imagining system, or LED-based tracking system may detect a deformation of a surface (e.g., the computing device 101) and transmit one or more sensor signals associated with the deformation to the processor 102.

The computing device 101 further comprises one or more additional sensor(s) 130. The sensor(s) 130 are configured to transmit a sensor signal to the processor 102. In some embodiments, the sensor 130 may comprise, for example, a camera, humidity sensor, ambient light sensor, gyroscope, GPS unit, accelerometer, range sensor or depth sensor, biorhythm sensor, or temperature sensor. Although the embodiment shown in FIG. 1 depicts the sensor 130 internal to computing device 101, in some embodiments, the sensor 130 may be external to computing device 101. For example, in some embodiments, the one or more sensors 130 may be associated with a wearable device and/or coupled to a user's body. In some embodiments, the processor 102 may be in communication with a single sensor 130 and, in other embodiments, the processor 102 may be in communication with a plurality of sensors 130, for example, a temperature and a humidity sensor.

Computing device 101 further includes haptic output device 118 in communication with processor 102. The haptic output device 118 is configured to output a haptic effect in response to a haptic signal. In some embodiments, the haptic output device 118 is configured to output a haptic effect comprising, for example, a vibration, a change in a perceived coefficient of friction, a simulated texture, a change in temperature, a stroking sensation, an electro-tactile effect, or a surface deformation (i.e., a deformation on a surface associated with the computing device 101). Further, some haptic effects may use multiple haptic output devices 118 of the same or different types in sequence and/or in concert. Although a single haptic output device 118 is shown here, embodiments may use multiple haptic output devices 118 of the same or different type to produce haptic effects.

In the embodiment shown in FIG. 1, the haptic output device 118 is in communication with processor 102 and internal to computing device 101. In other embodiments, the haptic output device 118 may be remote from computing device 101, but communicatively coupled to processor 102, for example, as shown in FIG. 2. For instance, haptic output device 118 may be external to and in communication with computing device 101 via wired interfaces such as Ethernet, USB, IEEE 1394, and/or wireless interfaces such as IEEE 802.11, Bluetooth, or radio interfaces. In some embodiments, the haptic output device 118 may be coupled to a wearable device that may be remote from the computing device 101 (e.g., as shown in FIG. 2).

In some embodiments, the haptic output device 118 may be configured to output a haptic effect comprising a vibration. The haptic output device 118 may comprise, for example, one or more of a piezoelectric actuator, an electric motor, an electro-magnetic actuator, a voice coil, a shape memory alloy, an electro-active polymer, a solenoid, an eccentric rotating mass motor (ERM), or a linear resonant actuator (LRA).

In some embodiments, the haptic output device 118 may be configured to output a haptic effect modulating the perceived coefficient of friction on the touch sensitive surface 116 in response to a haptic signal. In one embodiment, the haptic output device 118 comprises an ultrasonic actuator. An ultrasonic actuator may vibrate at an ultrasonic frequency, for example 20 kHz, increasing or reducing the perceived coefficient at the surface of touch sensitive surface 116. In some embodiments, the ultrasonic actuator may comprise a piezo-electric material.

In some embodiments, the haptic output device 118 may use electrostatic attraction, for example by use of an electrostatic actuator, to output a haptic effect. In such an embodiment, the haptic effect may comprise a simulated texture, a simulated vibration, a stroking sensation, or a perceived change in a coefficient of friction on a surface associated with computing device 101 (e.g., touch sensitive surface 116). In some embodiments, the electrostatic actuator may comprise a conducting layer and an insulating layer. The conducting layer may be any semiconductor or other conductive material, such as copper, aluminum, gold, or silver. The insulating layer may be glass, plastic, polymer, or any other insulating material. Furthermore, the processor 102 may operate the electrostatic actuator by applying an electric signal, for example an AC signal, to the conducting layer. In some embodiments, a high-voltage amplifier may generate the AC signal. The electric signal may generate a capacitive coupling between the conducting layer and an object (e.g., a user's finger, head, foot, arm, shoulder, leg, or other body part, or a stylus) near or touching the haptic output device 118. In some embodiments, varying the levels of attraction between the object and the conducting layer can vary the haptic effect perceived by a user.

In some embodiments, the haptic output device 118 may comprise a deformation device configured to output a deformation haptic effect. In some embodiments, the deformation haptic effect may comprise deforming the surface of the touch sensitive surface 116 (e.g., raising or lowering portions of the surface of the touch sensitive surface 116). In some embodiments, the deformation haptic effect may comprise bending, folding, rolling, twisting, squeezing, flexing, changing the shape of, or otherwise deforming the computing device 101 or a surface associated with the computing device 101 (e.g., the touch sensitive surface 116). That is, the deformation haptic effect may apply a force on the computing device 101 or a surface associated with the computing device 101, causing it to bend, fold, roll, twist, squeeze, flex, change shape, or otherwise deform. Further, in some embodiments, the deformation haptic effect may comprise preventing or resisting the computing device 101 or a surface associated with the computing device 101 from bending, folding, rolling, twisting, squeezing, flexing, changing shape, or otherwise deforming.

In some embodiments, the haptic output device 118 may comprise fluid configured for outputting a deformation haptic effect (e.g., for bending or deforming the computing device 101 or a surface associated with the computing device 101). For example, in some embodiments, the fluid may comprise a smart gel. A smart gel may comprise a fluid with mechanical or structural properties that change in response to a stimulus or stimuli (e.g., an electric field, a magnetic field, temperature, ultraviolet light, shaking, or a pH variation). For instance, in response to a stimulus, a smart gel may change in stiffness, volume, transparency, and/or color. In some embodiments, stiffness may comprise the resistance of a surface associated with the computing device 101 against deformation. In some embodiments, one or more wires may be embedded in or coupled to the smart gel. As current runs through the wires, heat is emitted, causing the smart gel to expand or contract, deforming the computing device 101 or a surface associated with the computing device 101. As another example, in some embodiments, the fluid may comprise a rheological (e.g., a magneto-rheological or electro-rheological) fluid. A rheological fluid may comprise metal particles (e.g., iron particles) suspended in a fluid (e.g., oil or water). In response to an electric or magnetic field, the order of the molecules in the fluid may realign, changing the overall damping and/or viscosity of the fluid. This may cause the computing device 101 or a surface associated with the computing device 101 to deform.

In some embodiments, the haptic output device 118 may comprise a mechanical deformation device. For example, in some embodiments, the haptic output device 118 may comprise an actuator coupled to an arm that rotates a deformation component. The deformation component may comprise, for example, an oval, starburst, or corrugated shape. The deformation component may be configured to move a surface associated with the computing device at some rotation angles but not others. The actuator may comprise a piezoelectric actuator, rotating/linear actuator, solenoid, an electroactive polymer actuator, macro fiber composite (MFC) actuator, shape memory alloy (SMA) actuator, and/or other actuator. As the actuator rotates the deformation component, the deformation component may move the surface, causing it to deform. In such an embodiment, the deformation component may begin in a position in which the surface is flat. In response to receiving a signal from processor 102, the actuator may rotate the deformation component. In some embodiments, rotating the deformation component may cause one or more portions of the surface to raise or lower. The deformation component may, in some embodiments, remain in this rotated state until the processor 102 signals the actuator to rotate the deformation component back to its original position.

Further, other techniques or methods can be used to deform a surface associated with the computing device 101. For example, in some embodiments, the haptic output device 118 may comprise a flexible surface layer configured to deform its surface or vary its texture based upon contact from a surface reconfigurable haptic substrate (including, but not limited to, e.g., fibers, nanotubes, electroactive polymers, piezoelectric elements, or shape memory alloys). In some embodiments, the haptic output device 118 may be deformed, for example, with a deforming mechanism (e.g., a motor coupled to wires), air or fluid pockets, local deformation of materials, resonant mechanical elements, piezoelectric materials, micro-electromechanical systems ("MEMS") elements or pumps, thermal fluid pockets, variable porosity membranes, or laminar flow modulation.

In some embodiments, the haptic output device 118 may be a portion of the housing of the computing device 101. In other embodiments, the haptic output device 118 may be housed inside a flexible housing overlaying a surface associated with the computing device 101 (e.g., the front or back of the computing device 101). For example, the haptic output device 118 may comprise a layer of smart gel or rheological fluid positioned over a hinge in the computing device 101 (e.g., for allowing the computing device 101 to fold or bend). Upon actuating the haptic output device 118 (e.g., with an electric current or an electric field), the smart gel or rheological fluid may change its characteristics. This may cause the computing device 101 to fold, bend, or flex, or prevent (e.g., resist against) the computing device 101 from folding, bending, or flexing.

Turning to memory 104, program components 124, 126, and 128 are depicted to show how a device can be configured in some embodiments to provide shape input and output for a haptically-enabled deformable surface. In this example, a detection module 124 configures the processor 102 to monitor the deformation sensor 134 to determine a deformation in a surface associated with the computing device 101. For example, detection module 124 may sample the deformation sensor 134 to track the presence or absence of a bend in the surface and, if a bend is present, to track one or more of the amount, velocity, acceleration, pressure and/or other characteristics of the bend over time. Although the detection module 124 is depicted in FIG. 1 as a program component within the memory 104, in some embodiments, the detection module 124 may comprise hardware configured to monitor the deformation sensor 134 to detect or determine a bend in a surface associated with computing device 101. In some embodiments, such hardware may comprise analog to digital converters, processors, microcontrollers, comparators, amplifiers, transistors, and other analog or digital circuitry.

Haptic effect determination module 126 represents a program component that analyzes data regarding touch characteristics to determine a haptic effect to generate. Particularly, haptic effect determination module 126 may comprise code that determines a haptic effect to output based on an amount of flex (e.g., bending, folding, twisting, or stretching) in a surface associated with the computing device 101. The haptic effect determination module 126 may comprise code that selects one or more haptic effects to output. For example, in some embodiments, bend amounts (e.g., 10 degrees, 20 degrees, 30 degrees, etc.) may be mapped to functions (e.g., move to the next page in a virtual book, move several pages in the virtual book, or close the virtual book) associated with a user interface. Haptic effect determination module 126 may select different haptic effects based on the function. Alternatively, haptic effect determination module 126 may select different haptic effects based on the bend amount.

In some embodiments, haptic effect determination module 126 may comprise code that determines a haptic effect to output based on a position of the computing device 101 in real space or with respect to an object. For example, as the distance between the computing device 101 and the object increases, the haptic effect determination module 126 may determine a haptic effect comprising an increasing or decreasing magnitude.

Although the haptic effect determination module 126 is depicted in FIG. 1 as a program component within the memory 104, in some embodiments, the haptic effect determination module 126 may comprise hardware configured to determine one or more haptic effects to generate. In some embodiments, such hardware may comprise analog to digital converters, processors, microcontrollers, comparators, amplifiers, transistors, and other analog or digital circuitry.

Haptic effect generation module 128 represents programming that causes processor 102 to generate and transmit haptic signals to the haptic output device 118 to generate the selected haptic effect. For example, the haptic effect generation module 128 may access stored waveforms or commands to send to the haptic output device 118 to create the desired effect. In some embodiments, the haptic effect generation module 128 may comprise algorithms to determine the haptic signal. Further, in some embodiments, haptic effect generation module 128 may comprise algorithms to determine target coordinates for the haptic effect (e.g., coordinates for a location on the touch sensitive surface 116 at which to output a haptic effect).

Although the haptic effect generation module 128 is depicted in FIG. 1 as a program component within the memory 104, in some embodiments, the haptic effect generation module 128 may comprise hardware configured to determine one or more haptic effects to generate. In some embodiments, such hardware may comprise analog to digital converters, processors, microcontrollers, comparators, amplifiers, transistors, and other analog or digital circuitry.

FIG. 2 is another block diagram showing a system for shape input and output for a haptically-enabled deformable surface according to another embodiment. In the embodiment shown, system 200 comprises a computing device 201 having a processor 202 in communication with other hardware via bus 206. Computing device 201 may comprise, for example, a game console, laptop computer, or desktop computer.

Computing device 201 also comprises a memory 204, which comprises a detection module 224, haptic effect determination module 226, and haptic effect generation module 228. These components may be configured to function in similar ways as the memory 104, detection module 124, haptic effect determination module 126, and haptic effect generation module 128 depicted in FIG. 1, respectively.

Further, computing device 201 comprises network components 210, I/O components 212, storage 214, and sensors 230. In some embodiments, these components may be configured to function in similar ways as the network components 110, I/O components 112, storage 114, and sensors 130 depicted in FIG. 1, respectively. The computing device 201 also comprises a display 234. In some embodiments, the display 234 may comprise a separate component, e.g., a remote monitor, television, or projector coupled to processor 202 via a wired or wireless connection.

System 200 also includes an external device 236. In this example, the external device 236 is flexible, foldable, bendable, twistable, squeezable, stretchable, rollable, and/or otherwise deformable. In some embodiments, the external device 236 may comprise, for example, a game controller, a phone cover, or a wearable device.

The external device 236 may comprise a processor and/or network components 210. In this example, the external device 236 is in communication with computing device 201 via a wireless interface, such as IEEE 802.11, Bluetooth, or radio interfaces (e.g., transceiver/antenna for accessing a CDMA, GSM, UMTS, or other mobile communications network).

The external device 236 comprises I/O components 212, which may be configured to function in similar ways as the I/O 112 components depicted in FIG. 1. The external device 236 also comprises a user input device 238 coupled to the I/O components 212. The user input device 238 comprises a device for interacting with the external device 236, for example, a joystick, directional pad, button, switch, speaker, microphone, touch sensitive surface, and/or other hardware used to input data or output data.

The external device 236 further comprises one or more position sensors 232, deformation sensors 240, and haptic output devices 218. In some embodiments, these components may be configured to function in similar ways as the position sensors 132, deformation sensors 134, and haptic output devices 118 depicted in FIG. 1, respectively.

Figure 3C:
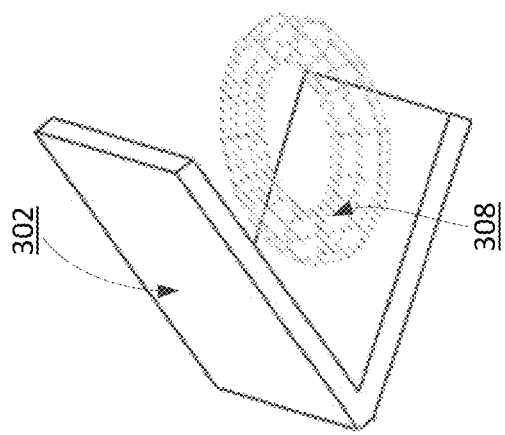
FIG. 3C shows still another embodiment of a system for shape input and output for a haptically-enabled deformable surface.
Figure 3B:
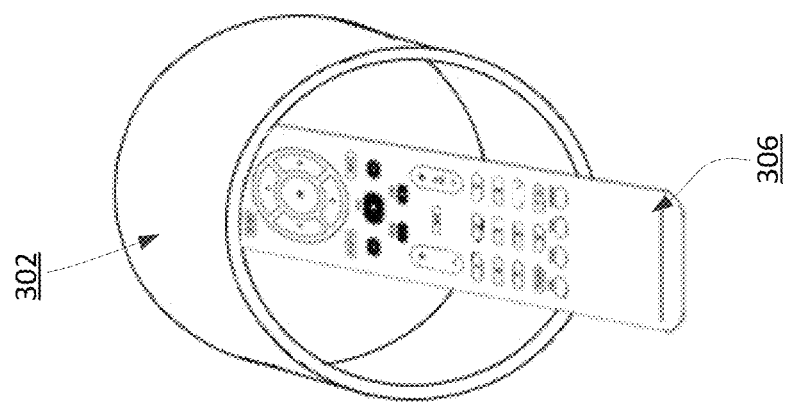
FIG. 3B shows another embodiment of a system for shape input and output for a haptically-enabled deformable surface.
Figure 3A:
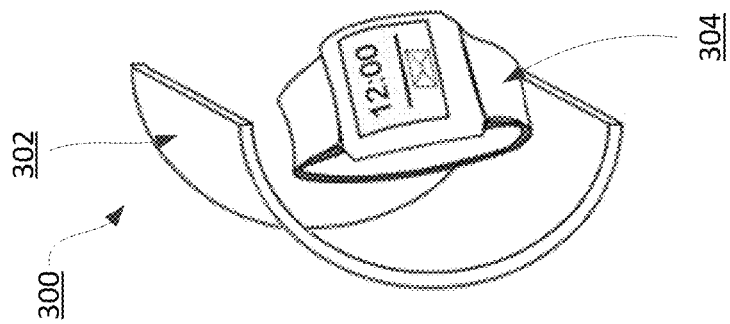
FIG. 3A shows an embodiment of a system for shape input and output for a haptically-enabled deformable surface.

FIG. 3A shows an embodiment of a system for shape input and output for a haptically-enabled deformable surface. The system 300 comprises a computing device 302 configured to flex, bend, fold, twist, squeeze, stretch, roll, or otherwise deform. In some embodiments, the computing device 302 may comprise a smartphone, tablet, or other type of computing device.

In some embodiments, a user may flex, bend, twist, squeeze, fold, stretch, roll, or otherwise deform the computing device 302 to provide input to the computing device 302. The computing device 302 may detect the user interaction and determine a function associated with the user interaction. In some embodiments, the computing device 302 may determine the position of the computing device 302 in real space or with respect to an object. Based on the position, the computing device 302 may determine a characteristic of the function (e.g., the object to associate with the function). The computing device 302 may then execute the function. Further, in some embodiments, the computing device 302 may output one or more haptic effects and/or sounds, e.g., associated with the function.

For example, in some embodiments, the computing device 302 may be configured to receive data from a remote device in response to a deformation enclosing the remote device. For instance, in some embodiments, a user may wish to receive e-mail data from a smart watch 304 the user may be wearing. The user may bend the computing device 302 partially around the smart watch 304, for example, such that the computing device 302 partially encloses the smart watch 304. The computing device 302 may detect the bend and associate the bend with a function comprising receiving data from a remote device. In some embodiments, the computing device 302 may then connect to the remote device and receive data from the remote device.

Further, in some embodiments, the computing device 302 may determine that the computing device 302 is partially enclosing the smart watch 304. For example, the computing device 302 may communicate with the smart watch 304 and receive position data (e.g., gyroscope and/or GPS data)

associated with the position of the smart watch 304. Based on the position data, the computing device 302 may determine the position of the smart watch 304 with respect to the computing device 302. Specifically, the computing device 302 may determine that the computing device 302 is partially enclosing the smart watch 304. Based on the above, the computing device 302 may associate the smart watch 304 with the data receipt function. The computing device 302 may execute the function by communicating (e.g., via Bluetooth or an 802.11 interface) with the smart watch 304 and receiving the e-mail data.

In some embodiments, upon receiving the e-mail data, the computing device 302 may output a haptic effect, for example, comprising a vibration. The vibration may indicate to the user that the computing device 302 has finished receiving the e-mail data. In some embodiments, the user may be able to unbend the computing device 302 to read or otherwise interact with the e-mail.

In some embodiments, the computing device 302 may be configured to transmit data to a remote device in response to a deformation enclosing the remote device. For instance, a user may have purchased a new game system. The user may wish to reprogram the user's television remote control 306 so that it is compatible with the new game system. As shown in FIG. 3B, the user may roll the computing device 302 around the remote control 306. The computing device 302 may detect the rolling interaction and associate it with a function comprising transmitting data to a remote device. The computing device 302 may also determine that the computing device 302 is enclosing the remote control 306 and associate the remote control 306 with the data transmission. The computing device 302 may transmit the data to the remote control 306, thereby reprogramming the remote control 306. In some embodiments, upon completing the transmission, the computing device 302 may output a haptic effect comprising a series of pulsed vibrations. The vibrations may indicate to the user that the computing device 302 has finished transmitting the data.

In some embodiments, the computing device 302 may be configured to interact with virtual object 308 in response to a deformation enclosing the virtual object 308. For instance, a user may view a virtual object 308 via, for example, augmented reality glasses. The user may want to rotate or move the virtual object 308 to see it from a different perspective. As shown in FIG. 3C, the user may fold the computing device 302 such that the top and bottom halves of the computing device 302 are enclosing the virtual object 308. Based on the folding of the computing device 302, and the position of the computing device 302 with respect to the virtual object 308, the computing device 302 may determine a function comprising virtually "grabbing hold" of the virtual object 308. In some embodiments, the computing device 302 may output a haptic effect comprising, for example, a click sensation (e.g., a pulse vibration) configured to indicate to the user that the user has grabbed hold of the virtual object 308. In other embodiments, the computing device 302 may output, for example, a simulated texture associated with the virtual object 308. This may allow the user to perceive the texture of the virtual object 308. The user may then rotate or move the computing device 302 in real space, and the computing device 302 may correspondingly rotate or move the virtual object 308 in virtual space.

In some embodiments, the user may unfold the computing device 302 from around the virtual object 308. In response, the computing device 302 may release its "hold" on the virtual object 308. In some embodiments, the computing device 302 may output another haptic effect comprising, for example, a click sensation. This may indicate to the user that the user has released the virtual object 308 and/or that the user is free to perform other functions with the computing device 302.

In some embodiments, the computing device 302 need not enclose or be near an object to interact with the object. Rather, in some embodiments, a user may deform the computing device 302 and orient it toward the object. Based on the deformation and orientation, the computing device 302 may interact with the object, for example, as described with respect to FIGS. 4-9.

Figure 4:
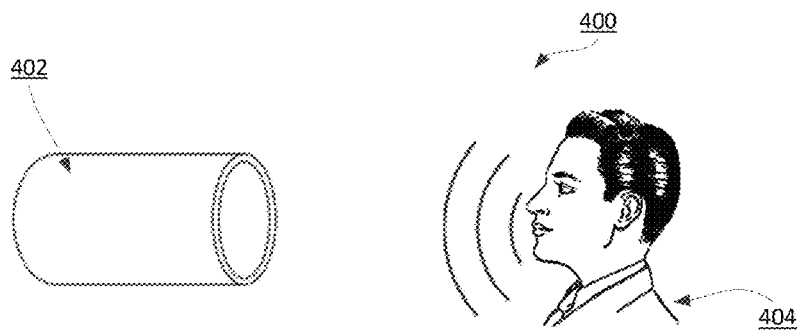
FIG. 4 shows an embodiment of a system for shape input and output for a haptically-enabled deformable surface.

FIG. 4 shows an embodiment of a system for shape input and output for a haptically-enabled deformable surface. In some embodiments, the computing device 402 may be configured to receive data from an object based at least in part on a cup-shaped deformation.

For example, in some embodiments, a user may want to perform sound-to-text conversion. A user may deform the computing device 402 into a cup shape and direct the opening of the cup shape toward a sound source 404. The sound source 404 may comprise, for example, a speaker, person (e.g., a voice), animal, another computing device 402, a MP3 player, or another electronic device or sound source. In some embodiments, the computing device 402 may be configured to output a haptic effect assisting the user in deforming the computing device 402 into a cup shape. For example, if the computing device 402 detects that the user has bent the computing device 402 more than 90 degrees, the computing device 402 may output a haptic effect configured to complete the cup shape (e.g., rolling the computing device 402 the rest of the way). In such an embodiment, the computing device 402 may output the deformation haptic effect by applying heat or electricity to a shape memory alloy. The shape memory alloy may be, for example, coupled to the back of the computing device 402. The shape memory alloy may be configured to bend or otherwise deform in response to heat or electricity, thereby causing the shape of the computing device 402 to bend or roll.

In some embodiments, the computing device 402 may detect the cup shape and associate the cup shape with a function comprising sound-to-text conversion. The computing device 402 may also determine that the computing device 402 is oriented toward the sound source 404. Based on the deformation and orientation, the computing device 402 may activate a microphone to begin receiving sounds. Further, the computing device 402 may process the sounds, for example, by filtering non-targeted sounds (e.g., background noise) and/or enhancing the targeted sounds (e.g., increasing the magnitude of the frequencies associated with the targeted sounds) from the sound source 404. The computing device 402 may then convert the processed sound to text. In some embodiments, the user may unbend the computing device 402 to end sound-to-text conversion and/or read the text via the computing device 402.

In some embodiments, a user may want to receive an audio file (e.g., a digital audio file, such a MP3, WAV, or WMA file) from a sound source 404 (e.g., another computing or electronic device). The user may deform the computing device 402 into a cup shape and direct the opening of the cup shape toward a sound source 404. In some embodiments, the computing device 402 may detect the cup shape and associate the cup shape with a function comprising receiving an audio file. The computing device 402 may also determine that the computing device 402 is oriented toward the sound source 404. Based on the deformation and orientation, the computing device 402 may communicate with the sound source 404 and receive the audio file from the sound source 402.

Figure 5:
FIG. 5 shows another embodiment of a system for shape input and output for a haptically-enabled deformable surface.

FIG. 5 shows another embodiment of a system for shape input and output for a haptically-enabled deformable surface. In some embodiments, the computing device 502 may execute a function based at least in part on an arc deformation. For example, a user may view content (e.g., an advertisement, product, or logo) on a screen 506 (e.g., a computer monitor, television screen, or a kiosk screen). The user may wish to receive information (e.g., a store's location, hours, website address, phone number, or an inventory list) associated with the content. The user may bend the computing device 502 into an arc oriented toward the screen 506. The computing device 502 may detect the arc deformation, associate it with receiving data, and determine that the arc is oriented toward the screen 506. Based on the deformation and orientation, the computing device 502 may communicate with the remote device and receive data associated with the content. In some embodiments, the computing device 502 may output a haptic effect associated with the received data or the content. For example, if the content comprises an advertisement for a golf store, the computing device 502 may output a haptic effect configured to simulate the impact of a golf ball. In some embodiments, the computing device 502 may output the data on a display.

Figure 6:
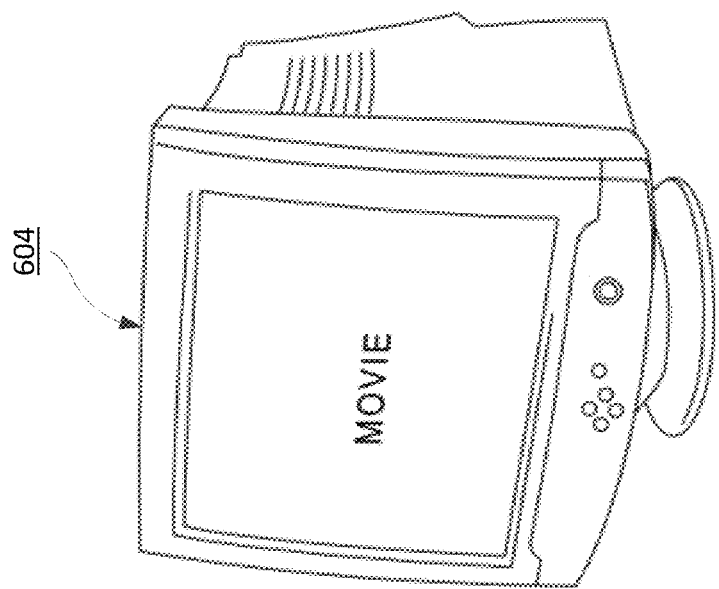
FIG. 6 shows an embodiment of a system for shape input and output for a haptically-enabled deformable surface.
Figure 6:
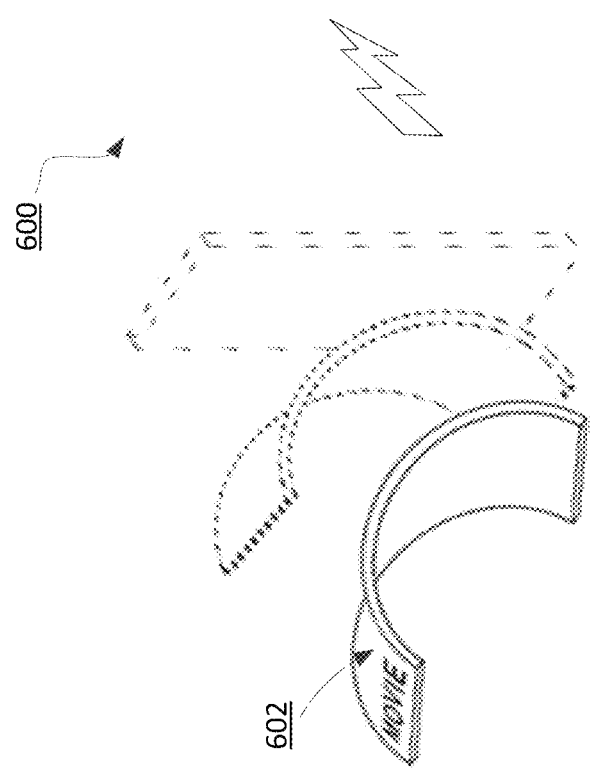

FIG. 6 shows an embodiment of a system for shape input and output for a haptically-enabled deformable surface. In some embodiments, the computing device 602 may execute a function (e.g., transmit a text message, instant message, or game to a remote device) based on a catapult interaction. For example, a user may wish to transmit a movie to a remote device (not shown), for instance, so that the user can view the movie on a large screen 604 coupled to the remote device. In some embodiments, the user may select the movie (e.g., from a list) and pull the top of the computing device 602 back like a catapult, while keeping the bottom of the computing device 602 stationary. In some embodiments, the computing device 602 may output a haptic effect comprising a creaking sensation or resisting against the bend. Further, once the computing device 602 is sufficiently bent, the computing device 602 may output a haptic effect comprising a click sensation or a click sound. The user may release the top of the computing device 602 so that it springs forward, returning the computing device 602 to its original shape. The computing device 602 may detect this catapult interaction and associate it with a function comprising transmitting data. The computing device 602 may further determine that the catapulting interaction is oriented toward the remote device. Based on the catapult interaction and orientation, the computing device 602 may transmit the movie data to the remote device.

In some embodiments, the computing device 602 may transmit a command to a remote device based on a catapult interaction. For instance, a user may have previously typed a text document on a remote device (e.g., a laptop computer). The user may have forgotten to save the document. In some embodiments, the user may perform a catapult interaction with the computing device 602 (e.g., the user's smart phone) oriented toward the remote device. The computing device 602 may detect the catapult interaction and associate it with a function comprising transmitting a "save" command. The computing device 602 may further determine that the catapulting interaction is oriented toward the remote device. Based on the deformation and orientation, the computing device 602 may transmit the save command to the remote device. In some embodiments, as the computing device 602 transmits the save command, the computing device 602 may output a continuous haptic effect (e.g., a stroking sensation). This may indicate to the user that transmission of the command is in progress. The remote device may receive and execute the command, for example, saving the document. In some embodiments, once the command has been received by the remote device, the computing device 602 may stop outputting the haptic effect. This may indicate to the user that transmission of the command is complete.

Figure 7:
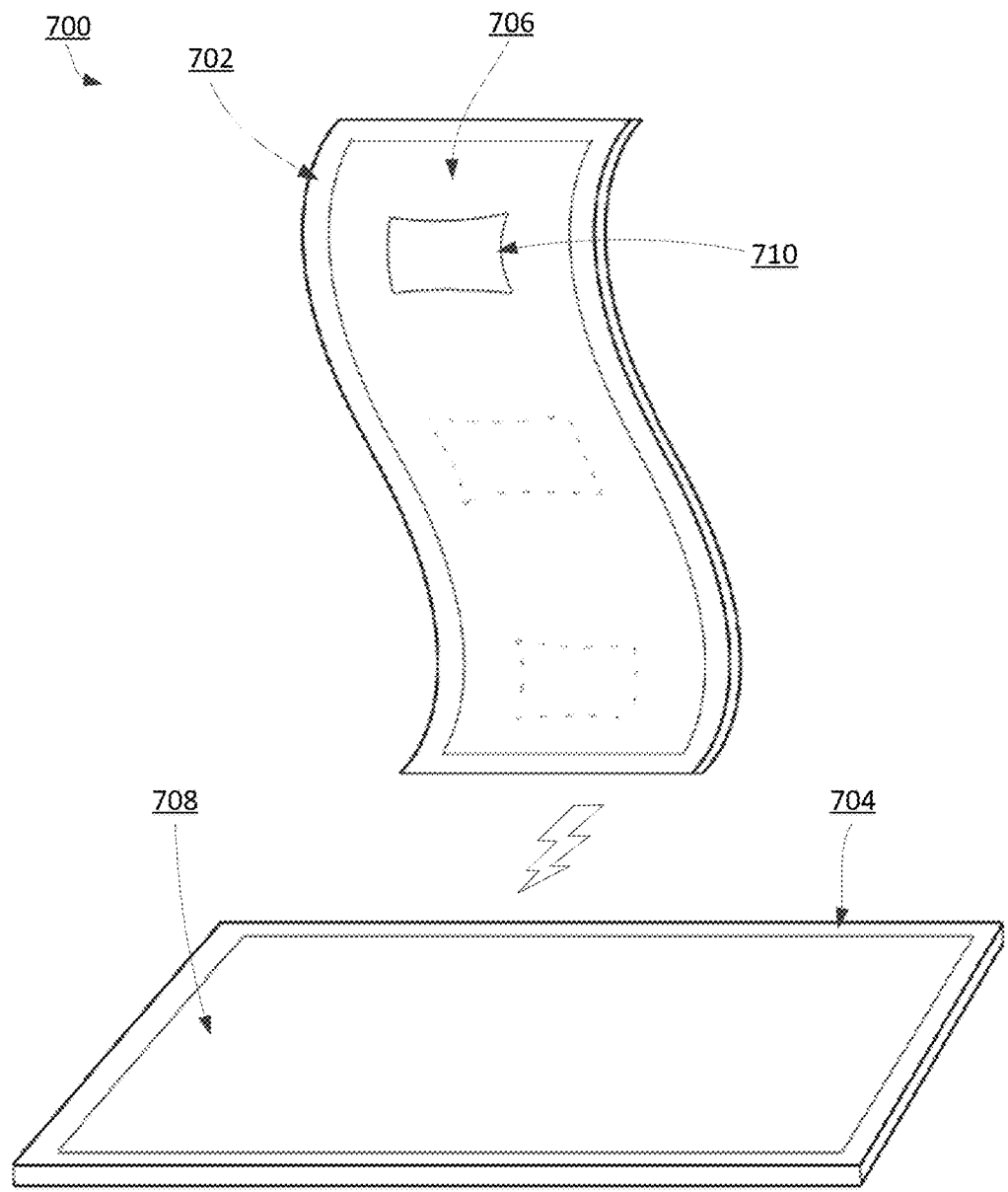
FIG. 7 shows another embodiment of a system for shape input and output for a haptically-enabled deformable surface.

FIG. 7 shows another embodiment of a system for shape input and output for a haptically-enabled deformable surface. In this example, the system 700 comprises a computing device 702 configured substantially the same as the computing device 702 of FIG. 3. The system 700 also comprises a remote device 704. The computing device 702 and the remote device 704 each comprise a display 706, 708. In this example, the computing device 702 is outputting a virtual object 710 (e.g., a photograph, photo gallery, avatar, a picture, icon, logo, text, a text message or instant message, or video) on the display 706.

In some embodiments, the computing device 702 may execute a function upon the user shaking the computing device 702. For example, a user may wish to transfer the virtual object 710 to the remote device 704. The user may place the computing device 702 above the remote device 704 and, for example, shake the computing device 702. In some embodiments, the computing device 702 may detect the shake interaction and associate it with a function comprising transmitting data. The computing device 702 may further determine that the computing device 702 is above the remote device 704. Based on the shake interaction and orientation of the computing device 702, the computing device 702 may transmit data associated with the virtual object 710 to the remote device 704. In some embodiments, as the data is transmitted to the remote device 704, the computing device 702 may output images on the display 706. For example, images of the virtual object 710 sliding downwardly toward the remote device 704. In some embodiments, the computing device 702 may output haptic effects configured to simulate the texture or movement of a real object (e.g., an object in real space, such as a brick, photograph, piece of paper, or rubber object), for example, sliding across a surface (e.g., a table or desk).

In some embodiments, a user may wish to clear a virtual object 710 from the display 706. The user may, for example, shake the computing device 702. In some embodiments, the computing device 702 may detect the shake interaction and associate it with a function clearing the virtual object 710 from the display. The computing device 702 may then execute the function and clear the virtual object 710 from the display 706.

Figure 8:
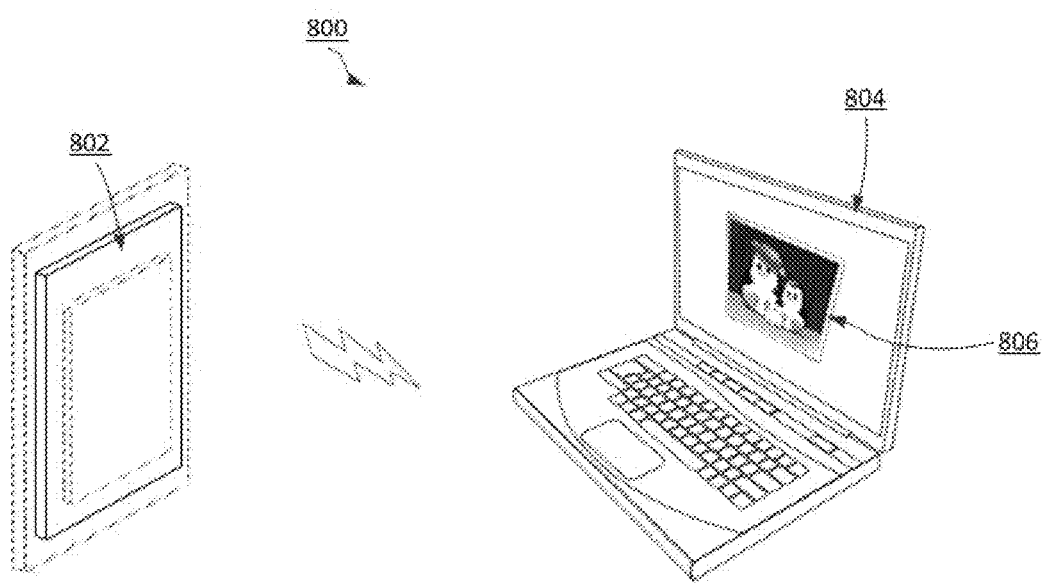
FIG. 8 shows still another embodiment of a system for shape input and output for a haptically-enabled deformable surface.

FIG. 8 shows still another embodiment of a system for shape input and output for a haptically-enabled deformable surface. In this example, the remote device 804 is outputting a virtual object 806 (e.g., a picture or photograph) on a display. A user may wish to interact with the virtual object 806 on the remote device 804. For example, the user may wish to enlarge or stretch the virtual object 806. The user may position the computing device 802 facing the remote device 804 and stretch the computing device 802. In some embodiments, the computing device 802 may detect the stretch interaction and associate it with a function comprising transmitting an "enlarge" command. The computing device 802 may further determine that the front of the computing device 702 is facing (e.g., oriented toward) the remote device 804. Based on the deformation and orientation, the computing device 802 may transmit the enlarge command to the remote device 804. Upon receiving the enlarge command, in some embodiments, the remote device 804 may enlarge the virtual object 806.

Further, in some embodiments, the user may wish to compress the virtual object 806. The user may position the computing device 802 facing the remote device 704 and compress the computing device 802. In some embodiments, the computing device 802 may detect the compression interaction and associate it with a function comprising transmitting a "compress" command. The computing device 802 may further determine that the front of the computing device 802 is facing the remote device 804. Based on the deformation and orentation, the computing device 802 may transmit the compress command to the remote device 804. Upon receiving the compress command, in some embodiments, the remote device 804 may compress the virtual object 806.

In some embodiments, the computing device 802 may output a haptic effect configured to, for example, indicate to the user that the command has been sent or that the command has been executed. For example, the computing device 802 may output a haptic effect comprising a long-duration vibration to indicate to the user that the virtual object 806 has been enlarged. The computing device 802 may output a haptic effect comprising a short-duration vibration to indicate to the user that the virtual object 806 has been compressed. Thus, the user may be able to interact with remote devices 804 and/or virtual objects 806 without having to visually focus on the computing device 802 or the remote device 804.

Figure 9:
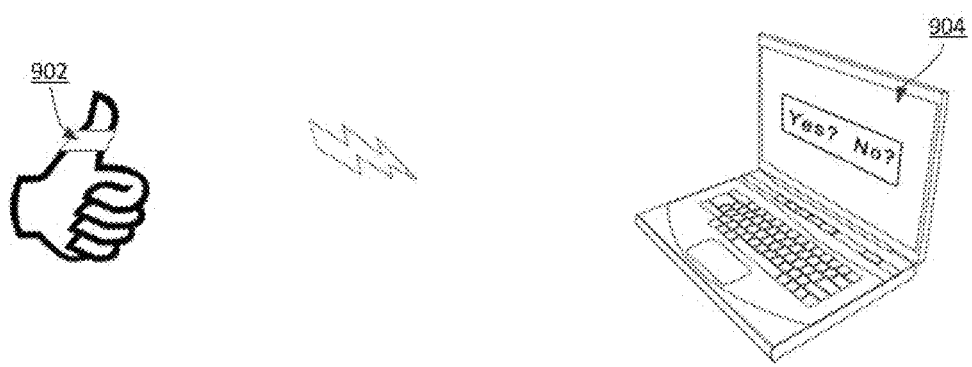
FIG. 9 shows an embodiment of a system for shape input and output for a haptically-enabled deformable surface.

FIG. 9 shows an embodiment of a system for shape input and output for a haptically-enabled deformable surface. In this example, the computing device 902 comprises a wearable device. The wearable device comprises a ring wrapped around a user's thumb. A remote device 904 is prompting the user to confirm performing a function, for instance, agreeing to terms of service associated with a piece of software. In some embodiments, the computing device 902 may output a haptic effect (e.g., a series of vibrations) configured to alert the user that a decision must be made.

In some embodiments, the user may perform a gesture (e.g., a thumbs-up signal, in which the user's fist is closed and a thumb is extended upward) to confirm performing the function. The computing device 902 may detect the gesture and associate it with a function comprising transmitting a "confirm" command. The computing device 902 may further determine that the computing device 902 or gesture is oriented toward the remote device 904. Based on the above, the computing device 902 may transmit the confirm command to the remote device 904. Upon receiving the confirm command, in some embodiments, the remote device 904 may perform the function (e.g., accept the terms of service). Further, the computing device 902 may output a haptic effect comprising, for example, a vibration to notify the user that the function has been completed.

In some embodiments, the user may perform a gesture (e.g., a thumbs-down signal, in which the user's fist is closed and a thumb is extended downward) to deny performance of the function. The computing device 902 may detect the gesture and associate it with a function comprising, for example, transmitting a "deny" command. The computing device 902 may further determine that the computing device 902 or gesture is oriented toward the remote device 904. Based on the above, the computing device 902 may transmit the deny command to the remote device 904. Upon receiving the deny command, in some embodiments, the remote device 904 may not perform the function. In some embodiments, the computing device 902 may not output a haptic effect if the function is not performed.

In some embodiments, the user may be able to bend a body part (e.g., a finger, leg, wrist, arm, hand, or foot), for example, to perform one or more functions. As the user bends a body part, the user may bend one or more components of the computing device 902. In some embodiments, the computing device 902 may detect the amount of bend and associate it with a function. For example, as the user bends a thumb 90 degrees, the computing device 902 may detect the bend. The computing device 902 may associate the amount of bend with a function comprising, for example, closing an application. The computing device 902 may further determine that the computing device 902 or bend gesture is oriented toward the remote device 904. Based on bend in and orientation of the computing device 902, the computing device 902 may transmit a "close" command to the remote device 904. Upon receiving the close command, in some embodiments, the remote device 904 may close an open application.

Figure 10:
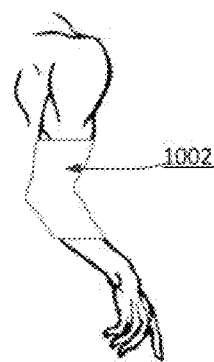
FIG. 10 shows another embodiment of a system for shape input and output for a haptically-enabled deformable surface.

FIG. 10 shows another embodiment of a system for shape input and output for a haptically-enabled deformable surface. In this example, the computing device 1002 comprises a wearable device comprising an arm band wrapped around the user's arm. The user may be, for example, at the gym. The user may flex the user's arm as part of a workout routine. This may also flex the computing device 1002 wrapped around the user's arm. In some embodiments, the computing device 1002 may detect the flexing. The computing device 1002 may further detect the position of the computing device 1002 in real space (e.g., the GPS location) and determine that the user is at the gym. Based on the flexing interaction and the position of the computing device 1002, the computing device 1002 may initiate, for example, a "workout buddy" mode. In some embodiments, the "workout buddy" mode may be configured to output haptic effects resisting against further flexing if the computing device 1002 determines that the user may be flexing an unsafe amount. Further, in some embodiments, the "workout buddy" mode may be configured to output haptic effects assisting the user in bending or flexing if the computing device 1002 determines the user needs the help performing a workout gesture.

Figure 11:
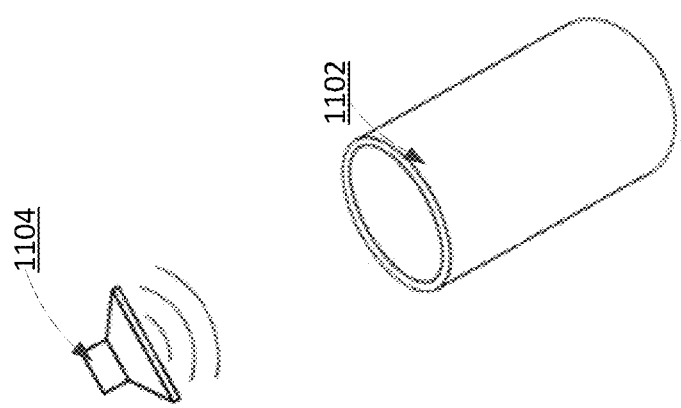
FIG. 11 shows an embodiment of a system for shape input and output for a haptically-enabled deformable surface.

Illustrative Systems for Shape Output for a
Haptically-Enabled Deformable Surface FIG. 11 shows an embodiment of a system for shape input and output for a haptically-enabled deformable surface. In some embodiments, the computing device 1102 may flex, bend, twist, squeeze, fold, stretch, roll, or otherwise deform to provide output to the user. The computing device 1102 may deform based on a system mode. Further, the computing device 1102 may determine the position of the computing device (e.g., in real space, or with respect to an object). In some embodiments, the computing device 1102 may execute a function associated with the position and the system mode. In some embodiments, the computing device 1102 may further output haptic effects and/or audio, for example, based on the function.

In some embodiments, the computing device 1102 may deform into the shape of a cup to provide output to a user. For example, the computing device 1102 may be configured to record a user's favorite song when the song plays on the radio. The computing device 1102 may analyze data from a microphone to determine the presence of the song. Upon the song playing on the radio, in some embodiments, the computing device 1102 may deform into a cup shape and begin recording. The cup shape may indicate to the user that the computing device 1102 has begun recording (i.e., that the system is in a recording mode). Further, the computing device 1102 may determine its position with respect to, for example, the speaker playing the song. The computing device 1102 may orient itself such that it is facing the speaker 1104 playing the song. This may simultaneously provide enhanced audio quality to the computing device 1102 while indicating to the user the sound source primarily associated with the recording. In some embodiments, the computing device 1102 may further output a haptic effect comprising a rumbling sensation. This may indicate to the user that recording is ongoing.

Figure 12:
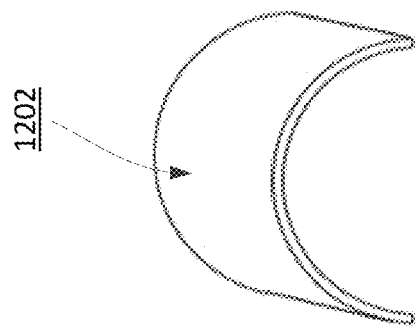
FIG. 12 shows another embodiment of a system for shape input and output for a haptically-enabled deformable surface.

FIG. 12 shows another embodiment of a system for shape input and output for a haptically-enabled deformable surface. In this example, the computing device 1202 is bending or flexing to provide output to a user.

For example, in some embodiments, the computing device 1202 may be about to receive data from or transmit data to a remote device (not shown). The computing device 1202 may bend into an arch shape, e.g., symbolizing an antenna. The arch shape may indicate to the user that the computing device 1202 is going to receive or transmit data. Further, the computing device 1202 may determine its position with respect to, for example, the remote device. In some embodiments, the computing device 1202 may determine an interface (e.g., a wired, wireless, Bluetooth, or 802.11g interface) through which to receive or transmit the data based on the position. For example, the computing device 1202 may receive or transmit the data by Bluetooth if the remote device is in close proximity to the computing device 1202, and receive or transmit the data over a wireless LAN or other means if the computing device 1202 is far from the remote device. If the user tries to flatten the computing device 1202, the computing device 1202 may output a haptic effect resisting the user, for example, until the data receipt or transmission is complete.

Figure 13:
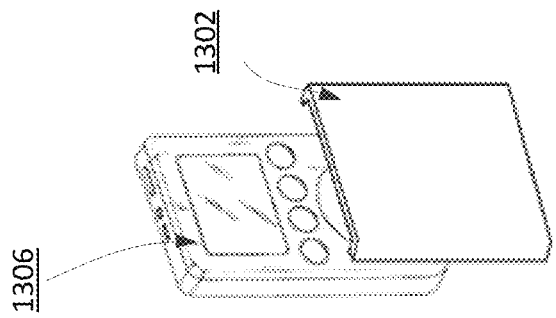
FIG. 13 shows still another embodiment of a system for shape input and output for a haptically-enabled deformable surface.

FIG. 13 shows still another embodiment of a system for shape input and output for a haptically-enabled deformable surface. In this example, the computing device 1302 is folding to provide output to a user. For example, a user may place the computing device 1302 in close proximity to a remote device 1306 (e.g., a MP3 player), for instance, to synchronize music data between the computing device 1302 and the remote device 1306. The computing device 1302 may determine its close proximity to the remote device 1306 and initiate a connection with the remote device 1306. The computing device 1302 may further deform itself, e.g., by folding its edges. The folded edges may indicate to the user that the computing device 1302 is communicating with the remote device 1306. The computing device 1302 and the remote device 1306 may then synchronize their music data with each other. In some embodiments, once synchronization is complete, the computing device 1302 may change shape back to its original, unfolded shape. This may indicate to the user that synchronization is complete and/or that the two devices are no longer communicating with each other. In some embodiments, the computing device 1302 may further output a haptic effect comprising a vibration, for example, to alert the user that synchronization is complete.

Figure 14:
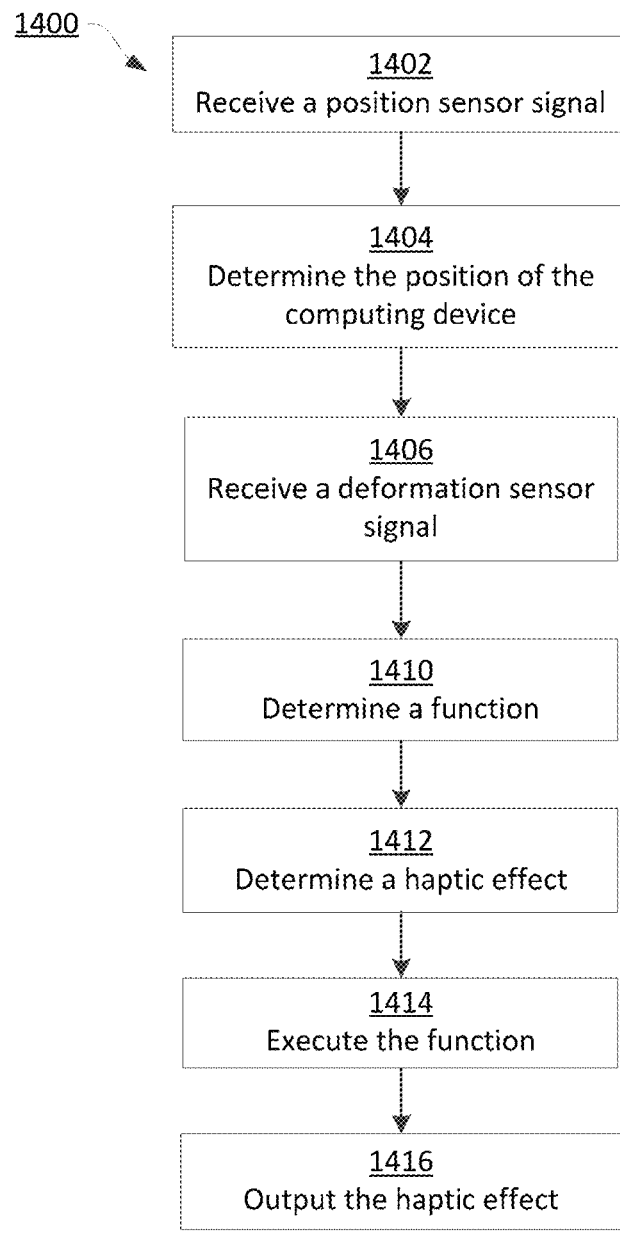
FIG. 14 is a flow chart of steps for performing a method for providing shape input for a haptically-enabled deformable surface according to one embodiment.

Illustrative Methods for Shape Input and Output for a Haptically-Enabled Deformable Surface FIG. 14 is a flow chart of steps for performing a method for providing shape input for a haptically-enabled deformable surface according to one embodiment. In some embodiments, the steps in FIG. 14 may be implemented in program code that is executed by a processor, for example, the processor in a general purpose computer, a mobile device, or a server. In some embodiments, these steps may be implemented by a group of processors. In some embodiments one or more steps shown in FIG. 14 may be omitted or performed in a different order. Similarly, in some embodiments, additional steps not shown in FIG. 14 may also be performed. The steps below are described with reference to components described above with regard to computing device 101 shown in FIG. 1.

The method 1400 begins at step 1402 when the processor 102 receives a position sensor signal associated with a position of the computing device 101 from position sensor 132. For example, in some embodiments, a user may orient the computing device 101 toward a remote device to interact with an application executing on the remote device, e.g., a drawing application. The position sensor 132 may detect the position and/or orientation of the computing device 101. The position sensor 132 may transmit a sensor signal associated with the position and/or orientation to the processor 102.

The method 1400 continues at step 1404 when the processor 102 determines the position of the computing device 101 based on the sensor signal. The position may be associated with the position of the computing device 101 in real space or with respect to an object. For example, in the above-mentioned drawing application embodiment, the computing device 101 may determine that position of the computing device 101 with respect to the remote device. For example, the computing device 101 may determine that the computing device 101 is oriented toward the remote device.

In some embodiments, the processor 102 may determine the position of the computing device 101 based on the GPS location of the computing device 101. For instance, in the above-mentioned drawing application embodiment, the processor 102 may determine that the computing device 101 is in the user's art studio based on the GPS location of the computing device 101. The user may have predesignated that, when the computing device 101 is in the user's art studio, all functions executed by the computing device 101 should be with respect to the remote device executing the drawing application.

The method 1400 continues at step 1406 when the processor 102 receives a deformation sensor signal from a deformation sensor 134. In some embodiments, the deformation sensor signal may be associated with a user interaction with the computing device 101. For example, in the above-mentioned drawing application embodiment, a user may bend the computing device 101 to, for example, input a command to the computing device. For example, in the drawing application described above, the command may be configured to cause the remote device to erase an existing drawing or start a new drawing. The deformation sensor 134 may detect the bend and transmit a sensor signal associated with the bend to the processor 102.

The method 1400 continues at step 1410 when the processor 102 determines a function. The processor 102 may determine a function based at least in part on the deformation sensor signal, the position sensor signal, a sensor signal from sensor 130, and/or a system mode. In some embodiments, the processor 102 may determine the function via an algorithm or lookup table stored in memory 104. For example, the processor 102 may consult a lookup table and associate specific deformation sensor signals with particular functions. For instance, in the above-mentioned drawing application, in response to the user bending the computing device 101, the processor 102 may consult the lookup table and associate a function comprising transmitting an "erase" command to the remote device. The erase command may be configured to cause the remote device to erase an existing drawing. As another example, in response to the user folding an ear of the computing device 101, the processor 102 may consult the lookup table and associate a function comprising transmitting a "change color" command to the remote device. The change color command may be configured to cause the remote device to change the color of a line output by a virtual drawing tool (e.g., a drawing pen) to a darker shade.

In some embodiments, the processor 102 may determine the function based on a profile. For example, the computing device 101 may store associated "function profiles" in which a user can assign deformations the user would like associated with particular functions. For example, in some embodiments, the computing device 101 may store a deformation (e.g., an arc, twist, squeeze, fold, bend, cup shape, stretch, or compression) the user would like associated with a particular function (e.g., transmitting an erase command, image warp command, close image command, image enlarge command, or image compress command). In such an embodiment, the processor 102 may consult with the user's function profile to determine which function to perform. For example, if the user's function profile comprises a bend associated with transmitting an erase command, in response to the user bending the computing device 101, the processor 102 may determine a function comprising transmitting the erase command.

The method 1400 continues at step 1412 when the processor 102 determines a haptic effect. In some embodiments, the processor 102 may determine the haptic effect based at least in part on a sensor signal (e.g., from the position sensor 132, the sensor 130, or the deformation sensor 134), a function, a system mode, and/or an event.

In some embodiments, the processor 102 may rely on programming contained in haptic effect determination module 126 to determine the haptic effect. For example, in some embodiments, the haptic effect determination module 126 may comprise a lookup table. In some embodiments, the haptic effect determination module 126 may consult the lookup table and associate sensor signal characteristics (e.g., magnitude, frequency, duration, or waveform), functions, system modes, or events with particular haptic effects. For example, in the above-mentioned drawing application embodiment, the haptic effect determination module 126 may associate a function comprising transmitting an erase command with a haptic effect comprising a short vibration. As another example, the user may fold the computing device 101 in half, for example, to cause the computing device 101 to transmit a "close drawing" command to the remote device. The close drawing command may be configured to cause the remote device to close an open drawing. The haptic effect determination module 126 may consult the lookup table and associate the folding interaction with a haptic effect comprising a long vibration.

In some embodiments, the processor 102 may determine the haptic effect based on if, or how much, the computing device 101 is flexed, twisted, squeezed, stretched, folded, bent, or otherwise deformed. For example, in one such embodiment, if the corner of the computing device 101 is folded more than 50%, the processor 102 may determine a haptic effect comprising resisting further folding of the computing device 101. For instance, in the above-mentioned drawing application embodiment, the user may fold the corner of the computing device 101 to cause the remote device to change the color of a line output by a virtual drawing tool (e.g., a drawing pen) to a darker shade. In such an embodiment, the processor 102 may determine that the user has folded the corner of the computing device more than 50%. The processor 102 may determine that, beyond a fold of 50%, the line color is already the darkest possible shade. Thus, the processor 102 may determine a haptic effect comprising resisting further folding of the corner of the computing device 101. This may notify the user that the color of the line is already its darkest possible shade. As another example, if the corner of the computing device 101 is bent less than 50%, the processor 102 may determine a haptic effect configured to assist the user in further bending the corner of the computing device 101. This may make changing color shades easier for the user.

Further, in some embodiments, the computing device 101 may store associated "haptic profiles" in which a user can determine and save in memory 104 a "profile" of the haptic effects the user would like associated with particular events, system modes, user interactions, and/or functions. For example, in one embodiment, a user can select from a list of options which haptic effect the user would like associated with flexing, bending, folding, or other deformations of the computing device 101. In some embodiments, the list may comprise, for example, haptic effects such as assist deformation, resist deformation, high-magnitude vibration, low-magnitude vibration, or a simulated texture. In such an embodiment, the processor 102 may consult with the user's haptic profile to determine which haptic effect to generate. For example, if the user's haptic profile associates bending the computing device 101 with a haptic effect comprising a high-magnitude vibration, in response to the user bending the computing device 101, the processor 102 may determine a haptic effect comprising a high-magnitude vibration.

In other embodiments, the processor 102 may determine the haptic effect based on the computing device's 101 shape or deformation. For example, in some embodiments, the processor 102 may determine a haptic effect comprising bending the computing device 101. Further, in some embodiments, the processor 102 may determine that the computing device 101 is already bent. Thus, the processor 102 may determine no haptic effect.

The method 1400 continues at step 1414 when the processor 102 executes the function. In some embodiments, the processor 102 may execute the function by executing one or more sub-functions. For example, in the above-mentioned drawing application embodiment, the processor 102 may transmit an erase command by generating the erase command, initiating communication with the remote device (e.g., via Bluetooth or another interface), transmitting the erase command, and/or waiting for a response from the remote device.

The method 1400 continues at step 1416 when the processor 102 causes the haptic output device 118 to output the haptic effect. The processor 102 may transmit a haptic signal associated with the haptic effect to the haptic output device 118. The haptic output device 118 is configured to receive the haptic signal and output the haptic effect. For example, the haptic output device 118 may receive a haptic signal and output a haptic effect comprising, for example, a vibration, a perceptible change in a coefficient of friction on a surface associated with the computing device 101, a simulated texture, or a stroking sensation.

In some embodiments, the haptic effect may comprise a deformation of the computing device 101 (e.g., bending, folding, flexing, twisting, squeezing, or stretching the computing device 101). For example, in the above-mentioned drawing application embodiment, the user may bend the computing device 101 to cause the computing device 101 to transmit an erase command to the remote device. In such an embodiment, upon transmitting the erase command, the processor 102 may cause the haptic output device 118 to output a haptic effect configured to unbend the computing device 101. That is, the haptic effect may return the computing device 101 to its original, unbent shape. Further, in some embodiments, the processor 102 may cause the haptic output device 118 to output a haptic effect configured to resist against the user bending the computing device 101 until, for example, the user has created a new drawing. This may prevent the user from causing the computing device 101 to transmit unnecessary erase commands if, for example, there is no drawing to erase.

Figure 15:
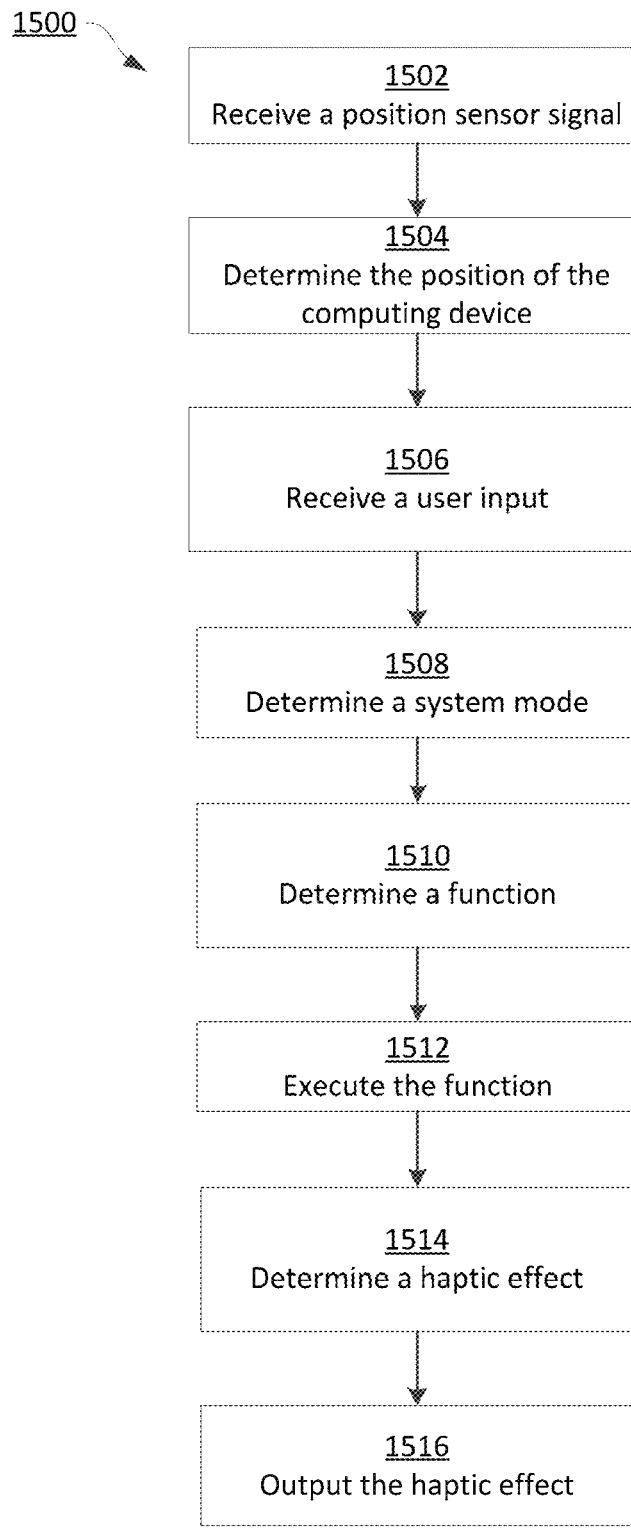
FIG. 15 is a flow chart of steps for performing a method for providing shape output for a haptically-enabled deformable surface according to another embodiment.

FIG. 15 is a flow chart of steps for performing a method for providing shape output for a haptically-enabled deformable surface according to another embodiment. In some embodiments, one or more steps shown in FIG. 15 may be performed in addition to or instead of one or more steps shown in FIG. 14.

The method 1500 begins at step 1502 when the processor 102 receives a position sensor signal associated with a position of the computing device 101 from position sensor 132. For example, in some embodiments, the computing device 101 may comprise a mobile device (e.g., a smart phone). The computing device 101 may be positioned remotely from the user. The position sensor 132 may detect the position and/or orientation of the computing device 101. The position sensor 132 may transmit a sensor signal associated with the position and/or orientation to the processor 102.

The method 1500 continues at step 1504 when the processor 102 determines the position of the computing device 101 based on the sensor signal. The position may be associated with the position of the computing device 101 in real space or with respect to an object. For example, in the above-mentioned mobile device embodiment, the computing device 101 may determine that position of the computing device 101 with respect to the user. For example, the computing device 101 may determine that the computing device 101 is positioned a certain distance (e.g., 15 feet) from the user.

The method 1500 continues at step 1506 when the processor 102 receives user input. In some embodiments, the user input may comprise a button press, a sound or voice, a change in orientation of the computing device 101, or interaction with a touch-sensitive surface 116. In some embodiments, the user input may be from a local user or a remote user. For example, in the above-mentioned mobile device embodiment, a remote user may make a phone call (i.e., the user input) to the computing device 101. The processor 102 may receive the phone call, thus receiving the remote user's input.

The method 1500 continues at step 1508 when the processor 102 determines a system mode. In some embodiments, the processor 102 may determine a system mode based at least in part on the user input, the position sensor signal, a sensor signal from sensor 130, and/or an event. For example, in the above-described mobile device embodiment, upon receiving the phone call from the remote user, the processor 102 may determine the system mode comprises phone call receipt mode.

In some embodiments, the processor 102 may consult one or more locations in memory 104 to determine the system mode. For example, in the above-described mobile device embodiment, the processor 102 may consult a location in memory 104 and determine that the computing device 101 is in a phone call receipt mode.

The method 1500 continues at step 1510 when the processor 102 determines a function. In some embodiments, the processor 102 may determine a function using any of the methods described above with respect to step 1410 of FIG. 14. For example, in the above-described mobile device embodiment, the processor 102 may determine a function based on the phone call receipt mode and the position of the computing device 101. For instance, the processor 102 may determine that the computing device 101 is positioned out of earshot from the user. Based on the incoming phone call and the position of the computing device 101 out of earshot from the user, the processor 102 may determine a function comprising sending an alert to another electronic device (e.g., another computing device 101, a beeper or pager, or a laptop computer) owned by the user. The alert may be configured to notify the user of the incoming phone call.

The method 1500 continues at step 1512 when the processor 102 executes the function. In some embodiments, the processor 102 may execute the function by executing one or more sub-functions. For example, in the above-described mobile device embodiment, the processor 102 may transmit an e-mail notification to the user's e-mail account. The user may receive the e-mail via another device, for example the user's laptop computer.

The method 1500 continues at step 1514 when the processor 102 determines a haptic effect. In some embodiments, the processor 102 may determine a haptic effect using any of the methods described above with respect to step 1412 of FIG. 14. For example, in the above-mentioned mobile device embodiment, the processor 102 may consult a lookup table and associate a phone call receipt mode with a particular haptic effect. For example, a haptic effect configured to fold the computing device 101. Such a haptic effect may allow the user to visually determine that the computing device 101 is receiving a phone call.

The method 1500 continues at step 1516 when the processor 102 causes the haptic output device 118 to output the haptic effect, for example, using any of the methods described above with respect to step 1416 of FIG. 14. For instance, in the above-mentioned mobile device embodiment, the haptic output device 118 may comprise a rheological fluid. The haptic output device 118 may be coupled to the back of the computing device 101 over a hinge in the computing device 101. The processor 102 may transmit a haptic signal to the haptic device output device 118, causing the physical properties of the rheological fluid to change. This may cause the computing device 101 to fold, thereby outputting the haptic effect.

Figure 16:
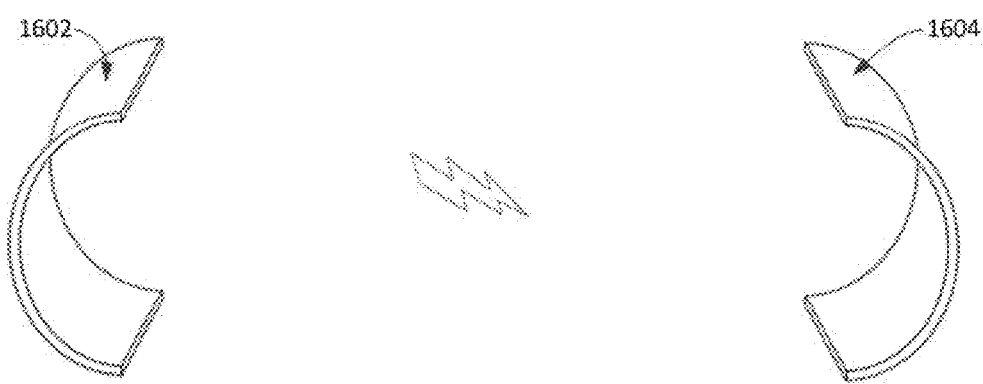
FIG. 16 shows an embodiment of a system for shape input and output for a haptically-enabled deformable surface.

Additional Embodiments of Systems for Shape Input and Output for a Haptically-Enabled Deformable Surface FIG. 16 shows an embodiment of a system for shape input and output for a haptically-enabled deformable surface. In some embodiments, the computing device 1602 may execute a function based at least in part on an arc deformation. For example, a user may wish to transmit data (e.g., an e-mail) to a remote device 1604. The user may bend the computing device 1602 into an arc oriented toward the remote device 1604. The computing device 1602 may detect the arc deformation, associate it with transmitting data, and determine that the arc is oriented toward the remote device 1604. Based on the deformation and orientation, the computing device 1602 may communicate with the remote device 1604 and transmit data to the remote device 1604. In some embodiments, the computing device 1602 may output a haptic effect associated with transmitting or the transmitted data.

Further, in some embodiments, one or more remote devices 1604 may output a haptic effect (e.g., a deformation) based at least in part on the function executed by the computing device 1602 or executing on the remote device 1604. For example, the remote device 1604 may flex, bend, or otherwise deform while receiving the data. This may notify the user or a third party that the remote device 1604 is receiving data. In some embodiments, the remote device 1604 may flex or bend in a direction oriented toward the computing device 1602. This may notify the user or a third party that the remote device 1604 is receiving data from the computing device 1602.

Advantages of Shape Input and Output for a Haptically-Enabled Deformable Surface There are numerous advantages to shape input and output for haptically-enabled deformable surfaces. Such systems may provide more intuitive user interfaces for users. For example, rather than pressing multiple buttons to transmit data from a computing device to a remote device, which may be slow, confusing, and arbitrary, a user may simply perform a catapult interaction directed toward the remote device. Such physical interactions (e.g., the catapult interaction) may provide faster, easier, and more intuitive user interfaces for the user.

In some embodiments, shape input and output for haptically-enabled deformable surfaces may provide a realistic or immersive user experience. For example, in some embodiments, the user may receive data from a remote device by deforming the computing device into an arc shape, like a baseball catcher's mitt, oriented toward the remote device, rather than pressing virtual buttons on a screen. Additionally, upon the completion of data transfer, the computing device may output a haptic effect configured to simulate catching an object (e.g., a baseball). Thus, the user may be able to initiate or "feel" the data transfer by physically interacting with the computing device.

In some embodiments, shape input and output for haptically-enabled deformable surfaces may indicate a mode the computing device is in, or serve as a confirmation that an operation is available or has been completed. For example, in some embodiments, the computing device may comprise a phone. The user may put the phone next to the user's face to make a call. The computing device may determine its orientation and location and deform, for example, to curve against the user's face. This may indicate to the user that the computing device is listening for voice input from the user. The user may then give a voice command (e.g., "call my wife"), which the computing device may interpret and execute.

In other embodiments, shape input and output for haptically-enabled deformable surfaces may enable a user to use software and user interfaces more effectively. For example, in some embodiments, deformation-based haptic feedback may assist or resist against a user performing certain functions. For instance, in some embodiments, deformation-based haptic feedback may assist a user in bending or folding a computing device to provide input, or resist against the user bending or folding the computing device if the user is not allowed to provide input at that time.

GENERAL CONSIDERATIONS

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process that is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, in which other rules may take precedence over or otherwise modify the application of the invention. Also, a number of steps may be undertaken before, during, or after the above elements are considered. Accordingly, the above description does not bound the scope of the claims.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Embodiments in accordance with aspects of the present subject matter can be implemented in digital electronic circuitry, in computer hardware, firmware, software, or in combinations of the preceding. In one embodiment, a computer may comprise a processor or processors. The processor comprises or has access to a computer-readable medium, such as a random access memory (RAM) coupled to the processor. The processor executes computer-executable program instructions stored in memory, such as executing one or more computer programs including a sensor sampling routine, selection routines, and other routines to perform the methods described above.

Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example tangible computer-readable media, that may store instructions that, when executed by the processor, can cause the processor to perform the steps described herein as carried out, or assisted, by a processor. Embodiments of computer-readable media may comprise, but are not limited to, all electronic, optical, magnetic, or other storage devices capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may comprise computer-readable media, such as a router, private or public network, or other transmission device. The processor, and the processing, described may be in one or more structures, and may be dispersed through one or more structures. The processor may comprise code for carrying out one or more of the methods (or parts of methods) described herein.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed:

1. A computing device comprising:
a deformable housing;
one or more sensors configured to detect a deformation in the deformable housing and a position of the computing device and transmit one or more sensor signals associated with the deformation and the position;
a processor in communication with the one or more sensors; and
a memory comprising program code that is executable by the processor to cause the processor to:
receive the one or more sensor signals from the one or more sensors;
determine an interaction with a virtual object in a virtual environment using the deformation in the deformable housing and the position of the computing device;
determine that a function of a particular type is to be performed based at least in part on the interaction, wherein the particular type of the function is determined based on the deformation in the deformable housing;
determine a parameter for the function based on the position of the computing device;
cause the function to be executed in accordance with the parameter;
determine a haptic effect based at least in part on the interaction; and
transmit a haptic signal associated with the haptic effect to a haptic output device, the haptic output device being configured to receive the haptic signal and output the haptic effect.

2. The computing device of claim 1, wherein the virtual environment comprises an augmented reality environment.

3. The computing device of claim 1, wherein the function comprises manipulating the virtual object.

4. The computing device of claim 3, wherein manipulating the virtual object comprises moving the virtual object or virtually grabbing hold of the virtual object.

5. The computing device of claim 1, wherein the interaction comprises at least partially enclosing the virtual object with the deformable housing.

6. The computing device of claim 1, wherein the interaction comprises the computing device being oriented toward the virtual object, and wherein the memory further comprises program code that is executable by the processor to cause the processor to:
determine that the computing device is oriented toward the virtual object based on the position of the computing device relative to the virtual object in the virtual environment.

7. The computing device of claim 1, wherein the interaction comprises the computing device being within a predetermined distance of the virtual object, and wherein the memory further comprises program code that is executable by the processor to cause the processor to:
determine that the computing device is within the predetermined distance of the virtual object based on the position of the computing device relative to the virtual object in the virtual environment.

8. A method comprising:
receiving, by a processor of a computing device, one or more sensor signals from one or more sensors, the one or more sensors being configured to detect a deformation in a deformable housing of the computing device and a position of the computing device;
determining, by the processor, an interaction with a virtual object in a virtual environment using the deformation in the deformable housing and the position of the computing device;
determining, by the processor, that a function of a particular type is to be performed based at least in part on the interaction, wherein the particular type of the function is determined based on the deformation in the deformable housing:
determining, by the processor, a parameter for the function based on the position of the computing device;
causing, by the processor, the function to be executed in accordance with the parameter;
determining, by the processor, a haptic effect based at least in part on the interaction; and
transmitting, by the processor, a haptic signal associated with the haptic effect to a haptic output device, the haptic output device being configured to receive the haptic signal and output the haptic effect.

9. The method of claim 8, wherein the virtual environment comprises an augmented reality environment.

10. The method of claim 8, wherein the function comprises moving the virtual object or virtually grabbing hold of the virtual object.

11. The method of claim 8, wherein the interaction comprises at least partially enclosing the virtual object with the deformable housing.

12. The method of claim 8, wherein the interaction comprises the computing device being oriented toward the virtual object, and further comprising:
   determining that the computing device is oriented toward the virtual object based on the position of the computing device relative to the virtual object in the virtual environment.

13. The method of claim 8, wherein the interaction comprises the computing device being within a predetermined distance of the virtual object, and further comprising:
   determining that the computing device is within the predetermined distance of the virtual object based on the position of the computing device relative to the virtual object in the virtual environment.

14. A non-transitory computer readable medium comprising program code that is executable by a processor of a computing device to cause the processor to:
   receive one or more sensor signals from one or more sensors, the one or more sensors being configured to detect a deformation in a deformable housing of the computing device and a position of the computing device;
   determine an interaction with a virtual object in a virtual environment using the deformation in the deformable housing and the position of the computing device;
   determine that that a function of a particular type is to be performed based at least in part on the interaction, wherein the particular type of the function is determined based on the deformation in the deformable housing;
   determine a parameter for the function based on the position of the computing device;
   cause the function to be executed in accordance with the parameter;
   determine a haptic effect based at least in part on the interaction; and
   transmit a haptic signal associated with the haptic effect to a haptic output device, the haptic output device being configured to receive the haptic signal and output the haptic effect.

15. The non-transitory computer readable medium of claim 14, wherein the function comprises moving the virtual object or virtually grabbing hold of the virtual object.

16. The non-transitory computer readable medium of claim 14, wherein the interaction comprises the computing device being oriented toward the virtual object, and further comprising program code that is executable by the processor to cause the processor to:
   determine that the computing device is oriented toward the virtual object based on the position of the computing device relative to the virtual object in the virtual environment.

17. The non-transitory computer readable medium of claim 14, wherein the interaction comprises the computing device being within a predetermined distance of the virtual object, and further comprising program code that is executable by the processor to cause the processor to:
   determine that the computing device is within the predetermined distance of the virtual object based on the position of the computing device relative to the virtual object in the virtual environment.

* * * * *